US011399189B2

(12) United States Patent
Kato et al.

(10) Patent No.: US 11,399,189 B2
(45) Date of Patent: Jul. 26, 2022

(54) IMAGE PROCESSING APPARATUS AND METHOD

(71) Applicant: SONY CORPORATION, Tokyo (JP)

(72) Inventors: Tsuyoshi Kato, Kanagawa (JP); Satoru Kuma, Tokyo (JP); Ohji Nakagami, Tokyo (JP); Koji Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/045,442

(22) PCT Filed: Mar. 28, 2019

(86) PCT No.: PCT/JP2019/013536
§ 371 (c)(1),
(2) Date: Oct. 5, 2020

(87) PCT Pub. No.: WO2019/198522
PCT Pub. Date: Oct. 17, 2019

(65) Prior Publication Data
US 2021/0176474 A1 Jun. 10, 2021

(30) Foreign Application Priority Data
Apr. 11, 2018 (JP) .............................. JP2018-076226

(51) Int. Cl.
H04N 19/167 (2014.01)
H04N 19/105 (2014.01)
(Continued)

(52) U.S. Cl.
CPC ......... H04N 19/167 (2014.11); H04N 19/105 (2014.11); H04N 19/159 (2014.11);
(Continued)

(58) Field of Classification Search
None
See application file for complete search history.

(56) References Cited

U.S. PATENT DOCUMENTS

2011/0286520 A1* 11/2011 Xu ....................... H04N 19/147
375/240.12
2015/0264392 A1* 9/2015 Thoreau ............... H04N 19/533
382/236

FOREIGN PATENT DOCUMENTS

CN 102308586 A 1/2012
CN 107481313 A 12/2017
(Continued)

OTHER PUBLICATIONS

Mekuria, et al., "Design, Implementation, and Evaluation of a Point Cloud Codec for Tele-Immersive Video", Transactions on Circuits and Systems for Video Technology, IEEE, vol. 27, No. 4, Apr. 2017, pp. 828-842.

(Continued)

Primary Examiner — Mikhail Itskovich
(74) Attorney, Agent, or Firm — Chip Law Group

(57) ABSTRACT

The present disclosure relates to an image processing apparatus and a method that make it possible to suppress reduction of the encoding efficiency. A patch, which is an image where 3D data representative of a three-dimensional structure is projected on a two-dimensional plane, is placed and packed in a frame image on the basis of an evaluation of a result of prediction performed in encoding of the 3D data, and the frame image in which the patch is placed and packed is encoded using the prediction. The present disclosure can be applied, for example, to an information processing apparatus, an image processing apparatus, electronic equipment, an information processing method, a program or the like.

19 Claims, 22 Drawing Sheets

(51) Int. Cl.
*H04N 19/159* (2014.01)
*H04N 19/184* (2014.01)
*H04N 19/46* (2014.01)
*H04N 19/593* (2014.01)
*H04N 19/597* (2014.01)

(52) U.S. Cl.
CPC .......... *H04N 19/184* (2014.11); *H04N 19/46* (2014.11); *H04N 19/593* (2014.11); *H04N 19/597* (2014.11)

(56) References Cited

FOREIGN PATENT DOCUMENTS

| CN | 107633539 A | 1/2018 |
|---|---|---|
| WO | 2019/055963 A1 | 3/2019 |

OTHER PUBLICATIONS

International Search Report and Written Opinion of PCT Application No. PCT/JP2019/013536, dated May 21, 2019, 07 pages of ISRWO.

Marius Preda, "Point Cloud Compression in MPEG", MP20 Workshop, Hong Kong, Oct. 28, 2017, 22 pages.

Dejun Zhang, "A new patch side information encoding method for PCC TMC2", International Organisation For Standardisation Organisation Internationale De Normalisation, ISO/IEC JTCI/SC29/WG11, Coding of Moving Pictures and Audio, Gwangju, Korea, Jan. 2018, 04 pages.

Sinharoy, et al., "Lossless Coding in TMC2", International Organisation For Standardisation Organisation Internationale De Normalisation, ISO/IEC JTCI/SC29/WG11 Coding of Moving Pictures and Audio, Gwangju, Korea, Jan. 2018, 11 pages.

Kobbelt, et al., "Multi-Chart Geometry Images", Eurographics Symposium on Geometry Processing, Jun. 2004, 10 pages.

Khaled Mammou, "PCC Test Model Category 2 v0", International Organisation For Standardisation Organisation Internationale De Normalisation, ISO/IEC JTCI/SC29/WG11, Coding of Moving Pictures and Audio, Gwangju, Korea, Jan. 2018, 11 pages.

Extended European Search Report of EP Application No. 119784781.7, dated Apr. 12, 2021, 12 pages.

Office Action for CN Patent Application No. 201980024216.2, dated Mar. 16, 2022, 06 pages of Office Action and 08 pages of English Translation.

Chao Liu, "Research on Point Cloud Data Processing And Reconstruction", Chinese Doctoral Dissertations & Master's Theses Full-text Database (Master), Information Science and Technology, Aug. 15, 2016, 71 pages.

\* cited by examiner

FIG. 3

| | | |
|---|---|---|
| | | PATCH IS PLACED SO AS TO IMPROVE PREDICTION ACCURACY |
| | | INTRA-PREDICTION ACCURACY IMPROVEMENT |
| | EVALUATION METHOD | EVALUATION OF PREDICTION RESULTS IN ALL INTRA-MODES |
| | | EVALUATION OF PREDICTION RESULTS IN INTRA MODES IN DIRECTION SAME AS Dilation DIRECTION |
| | | EVALUATION OF PREDICTION RESULTS OF PREDETERMINED INTRA MODE IN DIRECTION SAME AS Dilation DIRECTION |
| | | SIMPLE EVALUATION BASED ON PIXEL VALUE |
| | SEARCH METHOD | TEMPORARY PLACEMENT IN ALL PLACEMENT PERMITTING REGIONS |
| | | ROTATABLE |
| | | INVERTIBLE |
| | | INTER-PREDICTION ACCURACY IMPROVEMENT |
| | EVALUATION METHOD | EVALUATION OF PREDICTION RESULTS OF ALL INTER MODES |
| | SEARCH METHOD | TEMPORARY PLACEMENT IN ALL PLACEMENT PERMITTING FRAMES |
| | | ROTATABLE |
| | | INVERTIBLE |

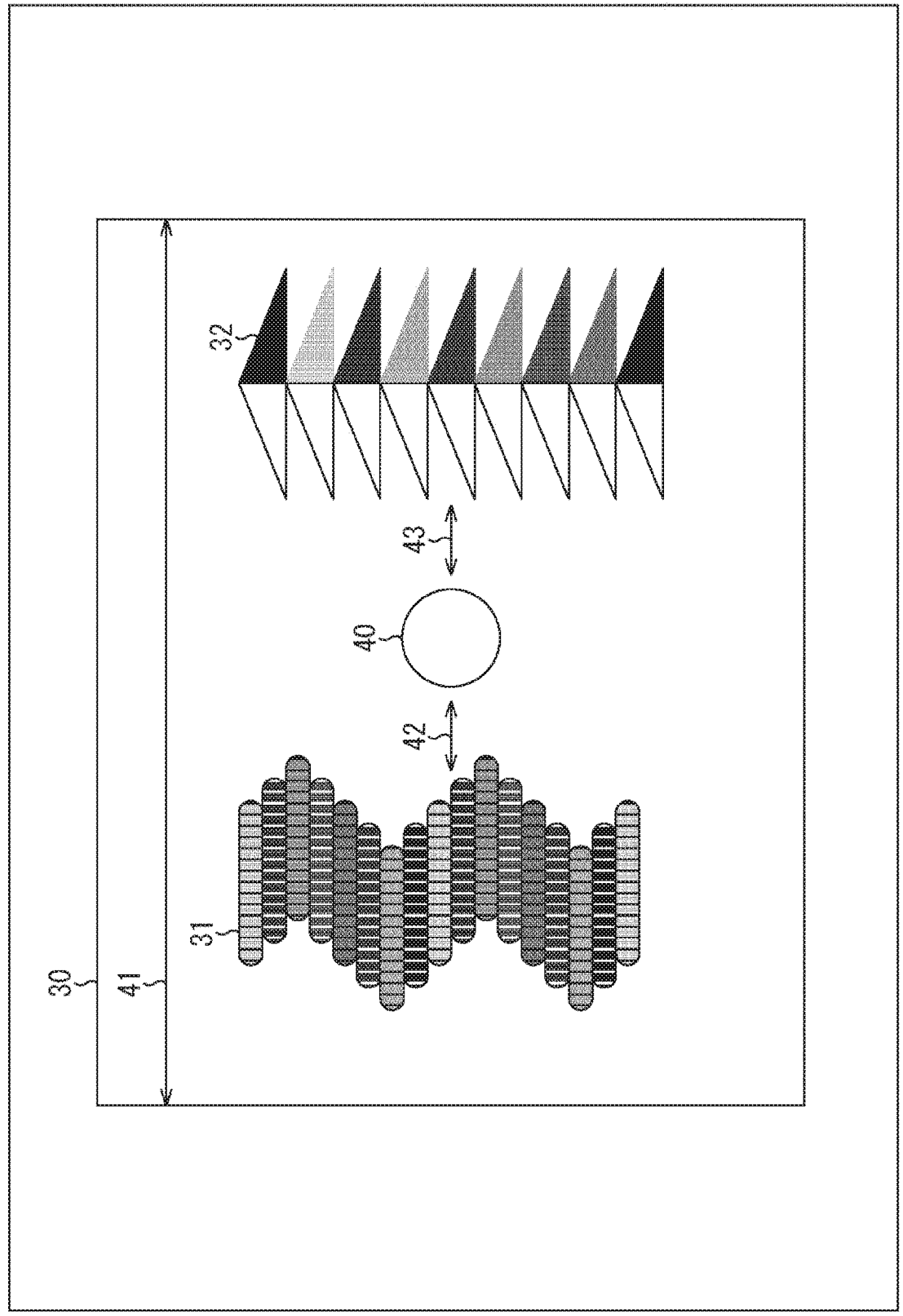

IMAGE PROCESSING APPARATUS AND METHOD

CROSS REFERENCE TO RELATED APPLICATIONS

This application is a U.S. National Phase of International Patent Application No. PCT/JP2019/013536 filed on Mar. 28, 2019, which claims priority benefit of Japanese Patent Application No. JP 2018-076226 filed in the Japan Patent Office on Apr. 11, 2018. Each of the above-referenced applications is hereby incorporated herein by reference in its entirety.

TECHNICAL FIELD

The present disclosure relates to an image processing apparatus and a method, and particularly, to an image processing apparatus and a method that make it possible to suppress reduction of the encoding efficiency.

Background Art

Conventionally, for example, as an encoding method for 3D data representative of a three-dimensional structure such as a point cloud (Point cloud), encoding that uses, for example, a voxel (Voxel) such as Octree is available (for example, refer to NPL 1)

In recent years, as a different encoding method, for example, there has been proposed an approach by which pieces of information regarding position and color of a point cloud are each projected on a two-dimensional plane for each small region and are encoded by an encoding method for a two-dimensional image (hereinafter, the approach is also referred to as a video-based approach (Video-Based approach)). In the case of this approach, in order to compress a projected patch by a 2D video codec, it is packed on the 2D plane.

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video," tcsvt_paper_submitted_february.pdf

SUMMARY

Technical Problem

However, in the conventional method, upon such packing, patches are placed at a location on a plane at which they can be placed sequentially in a descending order in size. In particular, since patches are placed without taking the 2D video codec in consideration, there is a possibility for the encoding efficiency to be reduced in the 2D video codec.

The present disclosure has been made in view of such a situation as described above and makes it possible to suppress reduction of the encoding efficiency.

Solution to Problem

The image processing apparatus of one aspect of the present technology is an image processing apparatus including a packing section configured to place and pack a patch in a frame image on the basis of an evaluation of a result of prediction performed in encoding of 3D data, the patch being an image where the 3D data representative of a three-dimensional structure is projected on a two-dimensional plane, and an encoding section configured to encode the frame image in which the patch is placed and packed by the packing section, by using the prediction.

The image processing method of the one aspect of the present technology is an image processing method including placing and packing a patch in a frame image on the basis of an evaluation of a result of prediction performed in encoding of 3D data, the patch being an image where the 3D data representative of a three-dimensional structure is projected on a two-dimensional plane, and encoding the frame image in which the patch is placed and packed, by using the prediction.

The image processing apparatus of a different aspect of the present technology is an image processing apparatus including a decoding section configured to decode encoded data of a frame image in which a patch is placed and packed in a frame image on the basis of an evaluation of a result of prediction performed in encoding of 3D data, the patch being an image where the 3D data representative of a three-dimensional structure is projected on a two-dimensional plane, and an unpacking section configured to unpack the frame image generated by the decoding section, on the basis of patch placement information indicative of a position of the patch.

The image processing method of the different aspect of the present technology is an image processing method including decoding encoded data of a frame image in which a patch is placed and packed in a frame image on the basis of an evaluation of a result of prediction performed in encoding of 3D data, the patch being an image where the 3D data representative of a three-dimensional structure is projected on a two-dimensional plane, and unpacking the generated frame image on the basis of patch placement information indicative of a position of the patch.

In the image processing apparatus and method of the one aspect of the present technology, a patch that is an image where 3D data representative of a three-dimensional structure is projected on a two-dimensional plane is placed and packed on a frame image on the basis of an evaluation of a result of prediction performed in encoding of the 3D data, and the frame image in which the patch is placed and packed is encoded using prediction.

In the image processing apparatus and method according to the different aspect of the present technology, encoded data of a frame image, in which a patch that is an image where 3D data representative of a three-dimensional structure is projected on a two-dimensional plane is placed and packed on the basis of an evaluation of a result of prediction performed in encoding of the 3D data, is decoded, and the generated frame image is unpacked on the basis of patch placement information indicative of a position of the patch.

Advantageous Effects of Invention

With the present disclosure, an image can be processed. Especially, reduction of the encoding efficiency can be suppressed.

BRIEF DESCRIPTION OF DRAWINGS

FIG. 3 is a diagram in which main features relating to the present technology are summarized.

FIG. 5 is a view illustrating a case in which patches are placed so as to improve intra-prediction accuracy.

DESCRIPTION OF EMBODIMENTS

In the following, modes for carrying out the present disclosure (hereinafter referred to as embodiments) are described. It is to be noted that the description is given in the following order.

1. Video-Based Approach
2. First Embodiment (intra-prediction accuracy improvement)
3. Second Embodiment (inter-prediction accuracy improvement)
4. Third Embodiment (intra- and inter-prediction accuracy improvement)
5. Note

1. Video-Based Approach

<Document etc. Supporting Technical Contents and Technical Terms>

The scope disclosed in the present technology includes not only contents described in the description of the embodiments but also contents described in the following pieces of NPL that were publicly known at the time of application.

NPL 1: (described hereinabove)

NPL 2: TELECOMMUNICATION STANDARDIZATION SECTOR OF ITU (International Telecommunication Union), "Advanced video coding for generic audiovisual services," H.264, April 2017

NPL 3: TELECOMMUNICATION STANDARDIZATION SECTOR OF ITU (International Telecommunication Union), "High efficiency video coding," H.265, December 2016

NPL 4: Jianle Chen, Elena Alshina, Gary J. Sullivan, Jens-Rainer, Jill Boyce, "Algorithm Description of Joint Exploration Test Model 4," JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

In other words, contents described in the pieces of NPL described above also serve as grounds for determining the support requirement. For example, even if the Quad-Tree Block Structure described in NPL 3 and the QTBT (Quad Tree Plus Binary Tree) Block Structure described in NPL 4 are not described directly in the embodiments, they fall within the scope of the disclosure of the present technology and the support requirement for claims is satisfied. Further, similarly, also in regard to technical terms such as parse (Parsing), syntax (Syntax), and semantics (Semantics), for example, even if there is no direct description of such terms in the description of the embodiments, they are within the scope of the disclosure of the present technology and the support requirement for the claims is satisfied.

<Point Cloud>

Conventionally, there exists data such as a point cloud that represents a three-dimensional structure by position information, attribute information, and so forth of a point cloud or a mesh that includes vertices, edges, and faces and defines a three-dimensional shape by using a polygonal representation.

Figure 1B:
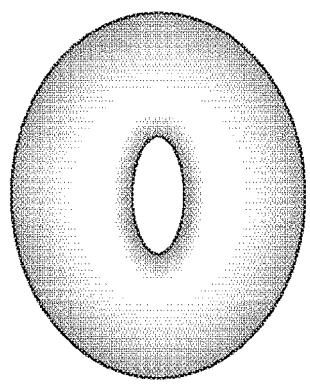
FIGS. 1A and 1B depict diagrams illustrating an example of a point cloud.
Figure 1A:
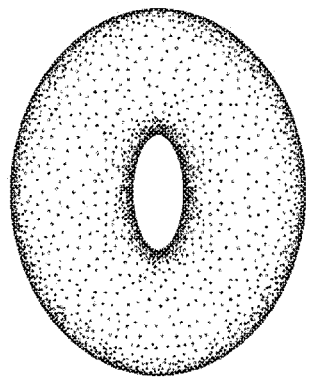

For example, in the case of the point cloud, such a three-dimensional structure as depicted in FIG. 1A is represented as such an aggregation of a great number of points (point cloud) as depicted in FIG. 1B. In particular, data of the point cloud includes position information and attribute information (for example, a color and so forth) of each point of the point cloud. Accordingly, the data structure is relatively simple, and any solid structure can be represented in sufficient accuracy by using a sufficiently great number of points.

<Outline of Video-Based Approach>

A video-based approach (Video-based approach) in which pieces of information regarding position and color of such a point cloud as described above are each projected on a two-dimensional plane for each small region and are encoded by an encoding method for a two-dimensional image has been proposed.

Figure 2:
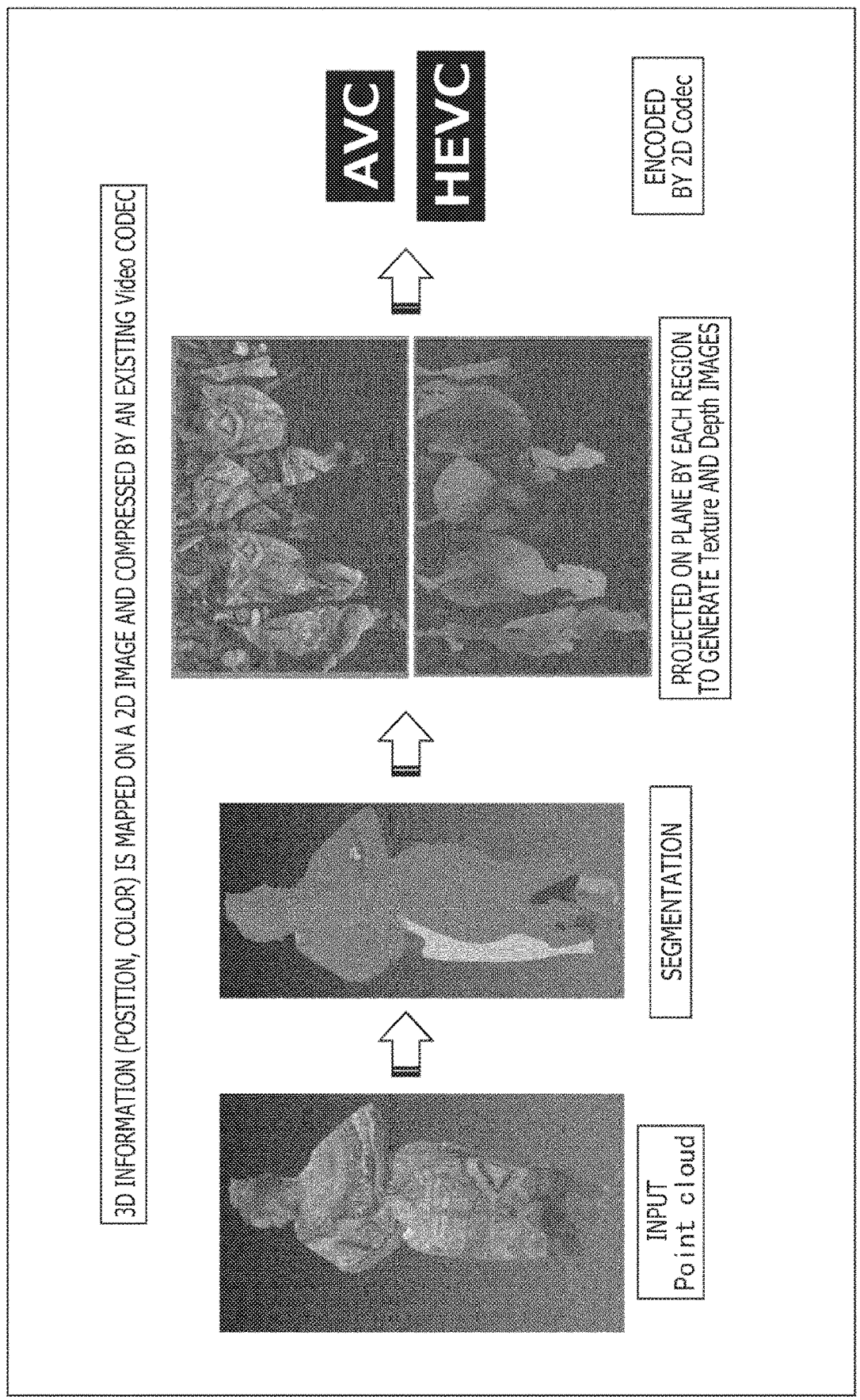
FIG. 2 is a view illustrating an example of an outline of a video-based approach.

In the video-based approach, for example, as depicted in FIG. 2, an inputted point cloud (Point cloud) is segmented in a plurality of segmentations (also referred to as regions) and is projected on a two-dimensional plane for each region. It is to be noted that data for each position of the point cloud (namely, data of each point) includes position information (Geometry (also referred to as Depth)) and attribute information (Texture) as described above and is projected on a two-dimensional plane by each region.

Then, each segmentation (also referred to as a patch) projected on the two-dimensional plane is placed and packed on a two-dimensional image and is then encoded by an encoding method for a two-dimensional plane image such as AVC (Advanced Video Coding) or HEVC (High Efficiency Video Coding), for example.

However, in the conventional method, upon packing, patches are placed in a descending order in size at locations on a plane at which they can be placed. In particular, since patches are placed without taking a 2D video codec in consideration, there is a possibility that for encoding efficiency to be reduced in the 2D video codec.

For example, if pixel values of contours (edge portions) opposite to each other of patches adjacent to each other are different from each other, then there is a possibility that the intra-prediction accuracy is reduced and the encoding efficiency is reduced. Further, for example, if a different patch having a high degree of similarity to a patch placed in a current frame that is a processing target is not placed in a reference frame, then there is a possibility that the inter-prediction accuracy is reduced.

<Patch Placement Based on Evaluation of Prediction Result>

Therefore, patches that are images where 3D data representative of a three-dimensional structure is projected on a two-dimensional plane are placed and packed on a frame image on the basis of evaluations of results of prediction performed in encoding of the 3D data, and the frame image in which the patches are placed and packed is encoded using prediction.

For example, the image processing apparatus includes a packing section that places and packs patches, which are images where 3D data representative of a three-dimensional structure is projected on a two-dimensional plane, on a frame image on the basis of evaluations of results of prediction performed in encoding of the 3D data, and an encoding section that encodes the frame image in which the patches are placed and packed by the packing section, by using prediction.

This makes it possible for an encoding apparatus 100 to perform placement and packing on a frame image on the basis of evaluations of results of prediction. As a result, patches can be placed so as to improve the prediction accuracy. Accordingly, the encoding efficiency of the 2D video codec can be increased. In other words, reduction of the encoding efficiency can be suppressed.

Further, encoded data of a frame image in which patches that are images where 3D data representative of a three-dimensional structure is projected on a two-dimensional plane are placed and packed on the basis of evaluations of results of prediction performed in encoding of the 3D data is decoded, and the generated frame image is unpacked on the basis of patch placement information indicative of positions of the patches.

For example, an image processing apparatus includes a decoding section that decodes encoded data of a frame image in which patches that are images where 3D data representative of a three-dimensional structure is projected on a two-dimensional plane are placed and packed on the basis of evaluations of results of prediction performed in encoding of the 3D data, and an unpacking section that unpacks the frame image generated by the decoding section, on the basis of patch placement information indicative of positions of the patches.

This makes it possible for a decoding apparatus 200 to correctly decode, on the basis of patch placement information, the encoded data of the frame image in which patches are placed and packed on the basis of evaluations of results of prediction. As a result, improvement of the prediction accuracy can be implemented. Accordingly, the encoding efficiency of a 2D video codec can be increased. In other words, reduction of the encoding efficiency can be suppressed.

<Present Technology Relating to Video-Based Approach>

The present technology relating to such a video-based approach as described above is described. In the present technology, a patch is placed on the basis of an evaluation of a result of prediction so as to improve the prediction accuracy as depicted in table 11 of FIG. 3.

<Intra-Prediction Accuracy Improvement>

The prediction accuracy may, for example, be intra-prediction accuracy.

Figure 4A:
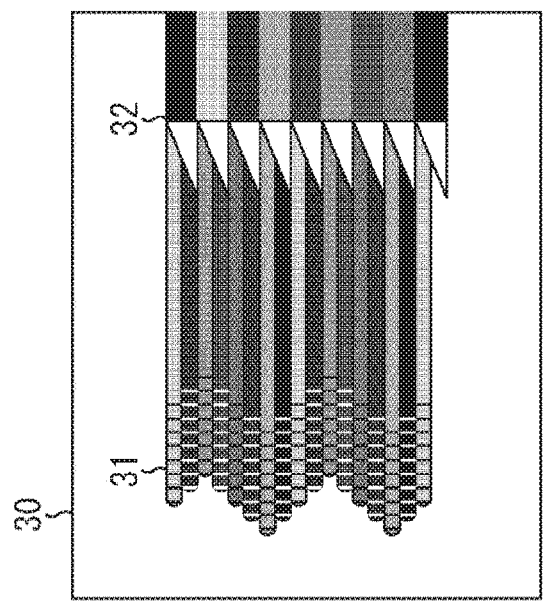
FIGS. 4A and 4B depict diagrams illustrating an outline of a Dilation process.
Figure 4B:
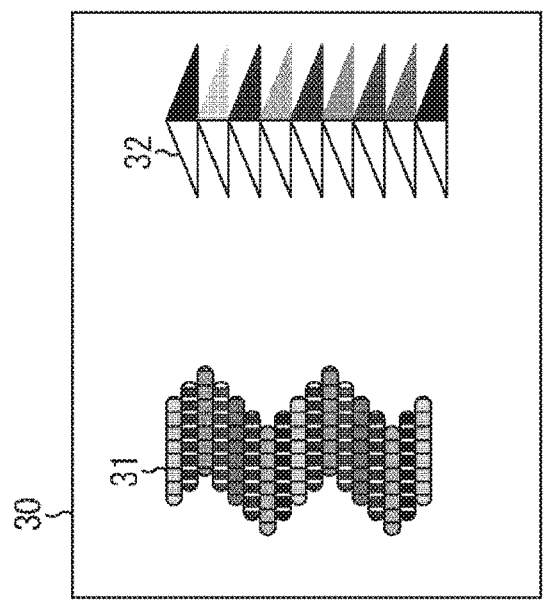

Generally, in packing, a Dilation process is performed after patches are placed. The Dilation process is a process that fills a space between placed patches with a pixel value of a contour of the patch. For example, in the case where patches 31 and patches 32 are placed in a frame image 30 as depicted in FIG. 4A, by performing the Dilation process, a pixel value of a right side contour of each patch is expanded to the right side in a horizontal direction to fill up a portion where a patch is not placed as depicted in FIG. 4B. Since this gives rise to continuity of pixel values between each patch and a right side peripheral region thereof, the prediction accuracy of intra-prediction is improved after the Dilation process is performed (FIG. 4B) in comparison with that before the Dilation process is performed (FIG. 4A).

However, in the case of the conventional method, since the placement of patches does not take intra prediction in consideration, there is a possibility that, also after the Dilation process is performed (FIG. 4B), pixel values are continuous between each patch and a left side peripheral region of the patch and the prediction accuracy is reduced.

Therefore, patches are placed on the basis of evaluations of results of intra-prediction so as to improve the intra-prediction accuracy. For example, a patch may be placed at a position where the evaluation of an intra-prediction result is optimum. While the position where the evaluation of the intra-prediction result is optimum may be known in advance, a position where the evaluation of the intra-prediction result is optimum may be searched for on the basis of an evaluation of the intra-prediction result such that a patch is placed at the searched out position.

<Evaluation Method>

The evaluation method of a result of intra prediction can be selected freely. For example, the intra-prediction may be performed in all modes, to evaluate prediction results. As an alternative, the intra prediction may be performed in modes in a direction same as the direction of the Dilation process, to evaluate prediction results. As another alternative, the intra-prediction may be performed in a predetermined mode among modes in a direction same as the direction of the Dilation process, to evaluate prediction results. For example, in the case where the Dilation process is performed in a horizontal direction as in the example of FIGS. 4A and 4B, only prediction results of a mode of INTRA_ANGULAR10 may be evaluated.

Further, evaluation may be performed by a method simpler than the method of performing intra-prediction described above, on the basis of pixel values in a state in which patches are placed.

For example, in the case of the example of FIGS. 4A and 4B, in the case where opposite faces of a patch 31 and another patch 32, namely, the pixel value of a right side contour of the patch 31 and the pixel value of a left side contour of the patch 32, coincide with each other or are approximate to each other (have continuity), continuity in pixel value is generated between the patch 32 and the left side periphery of the patch 32 in a state after the Dilation process is performed (FIG. 4B), and the intra-prediction accuracy can be increased.

Therefore, as a simplified method, for example, the difference between pixel values of opposite faces of a current patch that is a target for searching for a position for placement and a peripheral patch placed already may be evaluated such that a position where the evaluation of an intra-prediction result is optimum is searched for. For example, a current patch may be placed temporarily for each position where the current patch can be placed. In this case, the difference between pixel values of mutually opposite faces of the current patch and a peripheral patch positioned on a periphery of the temporarily placed current patch is evaluated in place of the intra-prediction result, and then, a position where the evaluation of the intra-prediction result is optimum is estimated on the basis of an evaluation result.

For example, as depicted in FIG. 5, it is assumed that patches 31 and patches 32 are placed already in a frame image 30 and the Dilation process is performed in a horizontal direction as indicated by a double arrow mark 41. In such a frame image 30 as just described, in the case where a current patch 40 is temporarily placed at such a position as depicted in FIG. 5, the difference between a pixel value of a left side contour of the current patch 40 and a pixel value of a right side contour of a patch 31 positioned on a periphery in a direction (horizontal direction) same as the direction of the Dilation process for the current patch 40 is evaluated as indicated by a double arrow mark 42. Further, as indicated by a double arrow mark 43, the difference between a pixel value of a right side contour of the current patch 40 and a pixel value of a left side contour of a patch 32 positioned on a periphery in a direction (horizontal direction) same as the direction of the Dilation process for the current patch 40 is evaluated. The evaluation result of the difference is made an evaluation of the intra-prediction result at the position where the current patch 40 is temporarily placed.

The difference between pixel values of opposite faces of the current patch and a peripheral patch is evaluated in this manner for each position where the current patch 40 can be placed, and a position where the evaluation of the intra-prediction result is optimum is estimated on the basis of such evaluation results. This makes it possible to search out a position where the evaluation of the intra-prediction result is optimum by a simple method without performing intra-prediction. In other words, increase of the load by the search can be suppressed.

<Search Method>

It is to be noted that the search method of a position where a current patch is to be placed can be selected freely. For example, a current patch may be placed temporarily at all positions in a region within which a current patch can be placed such that a result of intra-prediction is evaluated for each position. As an alternative, a current patch may temporarily be placed only at part of (representative) positions of a region within which a current patch can be placed such that a result of the intra-prediction is evaluated for each of such positions. As another alternative, the search range may be limited on the basis of an evaluation of a result of the intra-prediction for each position such that search is performed again.

Also in regard to a state in which a patch is rotated, a position where the evaluation of the intra-prediction result is optimum may be searched for. The rotation angle in this case can be selected freely. Further, a single rotation angle may be used, or a plurality of rotation angles may be used. In particular, a position where the evaluation of the intra-prediction result is optimum may be searched for in regard to a state in which a patch is rotated at each angle.

Also in regard to a state in which a patch is inverted (for example, inverted vertically, inverted horizontally or the like), a position where the evaluation of the intra-prediction result is optimum may be searched for. The inversion direction in this case can be selected freely. Further, a single inversion direction (for example, only a vertical inversion direction, a horizontal inversion direction or the like) may be used, or a plurality of inversion directions (for example, a vertical inversion direction, a horizontal inversion direction and so forth) may be used. In other words, in regard to a state in which a patch is inverted in each inversion direction, a position where the evaluation of the intra-prediction result is optimum may be searched for.

<Inter-Prediction Accuracy Improvement>

The prediction accuracy may, for example, be inter-prediction accuracy.

Generally, the prediction accuracy of inter-prediction is higher than that of intra-prediction. Therefore, patches may be placed in a plurality of frame images such that inter-prediction can be used.

Figure 6:
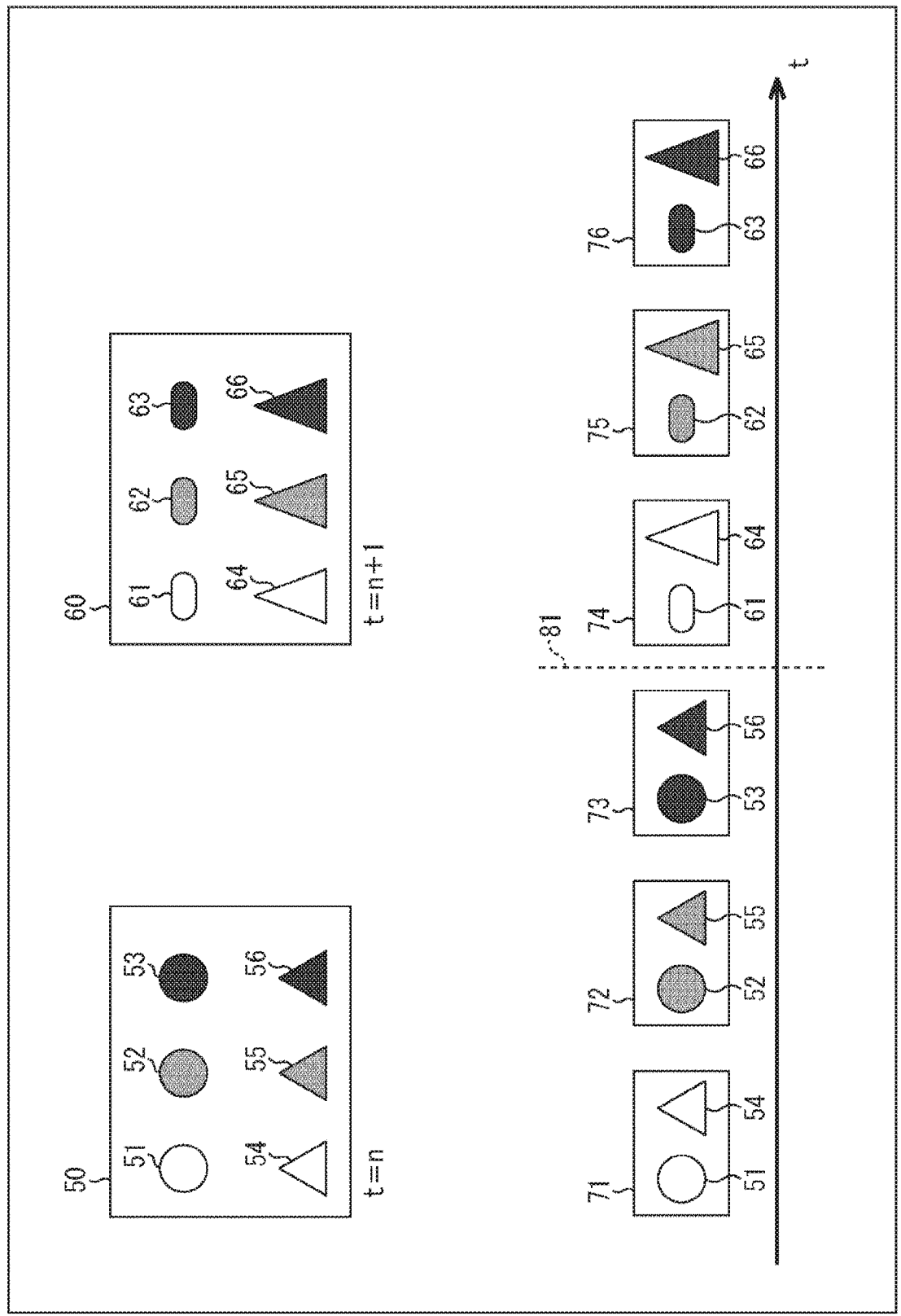
FIG. 6 is a view illustrating another case in which patches are placed so as to improve inter-prediction accuracy.

For example, a frame image 50 depicted on the upper side in FIG. 6 is a frame image at time t=n. In the frame image 50, patches 51 to 56 of predetermined 3D data at a predetermined time are placed by the conventional packing method. Similarly, a frame image 60 is a frame image at time t=n+1. In the frame image 60, patches 61 to 66 of 3D data at a point of time different from that of the frame image 50 or of 3D data different from that of the frame image 50 are placed by the conventional packing method.

In this manner, in the conventional method, patches placed in one frame image are placed in a plurality of frame images as depicted on the lower side in FIG. 6. It is to be noted that the difference in size between different frame images in FIG. 6 is caused for the convenience of illustration and the sizes of the frame images may be equal to each other.

In the case of the example of FIG. 6, the patches of the frame image 50 are placed in frame images 71 to 73. More particularly, patches 51 and 54 are placed in the frame image 71, patches 52 and 55 are placed in the frame image 72, and patches 53 and 56 are placed in the frame image 73. Further, the patches of the frame image 60 are placed in frame images 74 to 76. More particularly, patches 61 and 64 are placed in the frame image 74, patches 62 and 65 are placed in the frame image 75, and patches 63 and 66 are placed in the frame image 76.

In this manner, patches which have conventionally been placed in one frame image are placed in a plurality of frame images within a predetermined range (time) partitioned as indicated by a broken line 81. Since the frame images 71 to 76 are frame images of the same sequence, application of prediction in a time direction (inter-prediction) is possible. In particular, by placing patches similar in shape or the like to each other in frame images different from each other, it becomes possible to perform inter-prediction using the patches and to improve the prediction accuracy in comparison to that in the case of the intra-prediction.

It is to be noted that, while it is described in the description of the example of FIG. 6 that the sequence is partitioned as indicated by the broken line 81 and the patches are placed in frame images within a predetermined range, the sequence may not be partitioned in this manner, and it may be permitted to place patches in a freely-selected frame image or freely-selected frame images. However, in the case where the sequence is partitioned, the frame configuration can be rather simplified and increase of the amount of information for issuing a notification of the frame configuration to the decoding side can be suppressed.

Further, while the example of FIG. 6 is described such that patches are placed in frame images of one sequence, for example, patches that have conventionally been placed in one frame image may be placed in frame images of a plurality of layers or views.

Further, a layer or a view in which patches are to be placed may be changed for each conventional one frame. For example, in the case of FIG. 6, the patches 51 to 56 and the patches 61 to 66 may be placed in a plurality of frame images of layers (or views) different from each other.

As described above, when patches are placed in a plurality of frame images, each patch is placed on the basis of an evaluation of a result of inter-prediction. For example, a patch may be placed in a frame image that is optimum in the evaluation of the inter-prediction result. While a frame image that is optimum in the evaluation of the inter-prediction result may be known in advance, a frame image that is optimum in the evaluation of an inter-prediction result may be searched for on the basis of evaluations of the inter-prediction results such that the patches are placed in the searched out frame image.

<Evaluation Method>

The evaluation method of a result of inter-prediction can be selected freely. For example, the inter-prediction may be performed in all modes to evaluate prediction results. Alternatively, the inter-prediction may be performed in some modes to evaluate prediction results.

<Search Method>

It is to be noted that the search method of a frame image in which a current patch is to be placed can be selected freely. For example, a current patch may be placed temporarily in all frame images in which the current patch can be placed such that results of the inter-prediction are evaluated in regard to the frame images. As an alternative, a current patch may be placed temporarily in only some (representative frame images) of the frame images in which a current patch can be placed such that results of the inter-prediction are evaluated in regard to the frame images. As another alternative, the search range may be narrowed down on the basis of evaluations of results of the inter-prediction of the frame images, to perform search again.

Further, also in regard to a state in which a patch is rotated, a frame image that is optimum in the evaluation of the inter-prediction result may be searched out. The rotation angle in this case can be selected freely. Further, a single rotation angle may be used, or a plurality of rotation angles may be used. In other words, a frame image that is optimum in the evaluation of the inter-prediction result may be searched for in regard to a state in which a patch is rotated at each angle.

Further, also in regard to a state in which a patch is inverted (for example, inverted vertically, inverted horizontally or the like), a frame image that is optimum in the evaluation of the inter-prediction result may be searched for. The inversion direction in this case can be selected freely. Further, a single inversion direction (for example, only vertical inversion, only horizontal inversion or the like) may be used, or a plurality of inversion directions (for example, vertical inversion, horizontal inversion and so forth) may be used. In other words, a frame image that is optimum in the evaluation of the inter-prediction result may be searched for in regard to a state in which a patch is inverted in each inversion direction.

<Intra-Prediction & Inter-Prediction>

It is to be noted that the prediction accuracy described above may, for example, be both the intra-prediction accuracy and the inter-prediction accuracy. In particular, both placement position control of a patch based on the intra-prediction accuracy described above and placement frame image control of a patch based on the inter-prediction accuracy may be applied.

In such case, a frame image or a position in which the evaluation of the prediction result is optimum as described above may be searched for in regard to each of the intra-prediction and the inter-prediction, such that a patch is placed in the searched out frame image or position.

<Others>

It is to be noted that the patches described above may be patches of position information (Geometry) or patches of attribute information (Texture) such as color information to be added to the position information.

By controlling the placement of patches by such various methods as described above, the prediction accuracy can be improved, and reduction of the encoding efficiency can be suppressed.

2. First Embodiment

<Encoding Apparatus>

Figure 7:
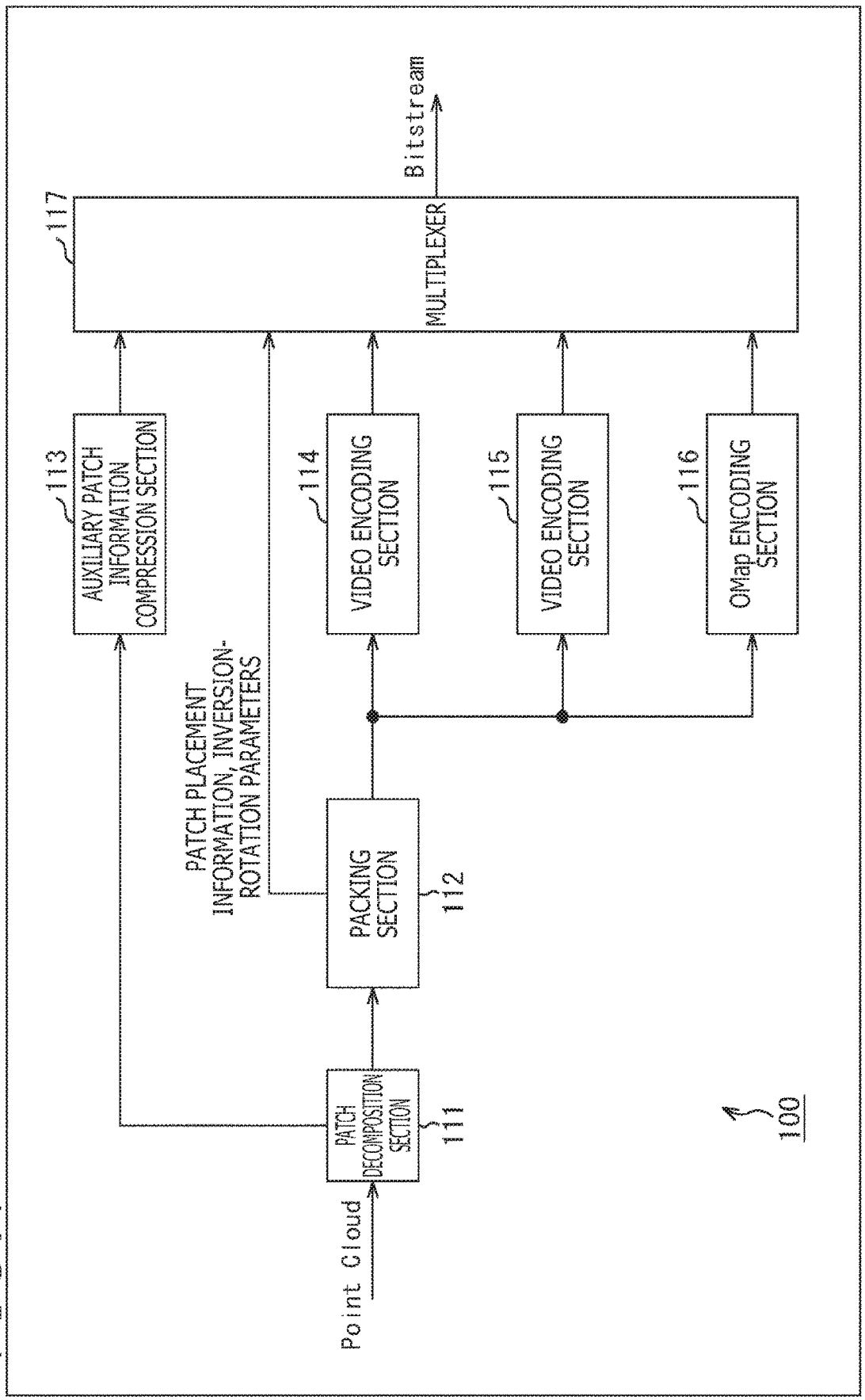
FIG. 7 is a block diagram depicting an example of principal components of an encoding apparatus.

Now, a configuration for implementing such various techniques as described above is described. FIG. 7 is a block diagram depicting an example of a configuration of an encoding apparatus that is one mode of an image processing apparatus to which the present technology is applied. The encoding apparatus 100 depicted in FIG. 7 is an apparatus that projects such 3D data as a point cloud on a two-dimensional plane to perform encoding by an encoding method for a two-dimensional image (encoding apparatus that applies a video-based approach). The encoding apparatus 100 in this case searches for a position where the evaluation of an intra-prediction result is optimum and places a patch at the searched out position.

It is to be noted that FIG. 7 depicts principal ones of processing sections, data flows and so forth and not all of such processing sections and data flows are depicted in FIG. 7. In other words, the encoding apparatus 100 may include any processing section that is not depicted as a block in FIG. 7 or may include any process or any data flow that is not depicted as an arrow mark or the like in FIG. 7. This similarly applies to the other figures describing processing sections and so forth in the encoding apparatus 100.

As depicted in FIG. 7, the encoding apparatus 100 includes a patch decomposition section 111, a packing section 112, an auxiliary patch information compression section 113, a video encoding section 114, another video encoding section 115, an OMap encoding section 116, and a multiplexer 117.

The patch decomposition section 111 performs a process relating to decomposition of 3D data. For example, the patch decomposition section 111 acquires 3D data (for example, a point cloud (Point Cloud)) and information relating to a View direction (View Info) inputted to the encoding apparatus 100 and representative of a three-dimensional structure. Further, the patch decomposition section 111 decomposes the acquired 3D data into plural segmentations and projects the 3D data on a two-dimensional plane by each of the segmentations, to generate patches. The patch decomposition section 111 supplies information relating to the generated patches to the packing section 112. Further, the patch decomposition section 111 supplies auxiliary patch information that is information relating to the decomposition to the auxiliary patch information compression section 113.

The packing section 112 performs a process relating to packing of data. For example, the packing section 112 acquires data (patches) of a two-dimensional plane on which 3D data is projected by each region that is supplied from the patch decomposition section 111. Further, the packing section 112 places the acquired patches in the two-dimensional image and packs them as a video frame. For example, the packing section 112 places patches of position information (Geometry) indicative of positions of points in a two-dimensional image, places patches of attribute information (Texture) such as color information added to the position information in a two-dimensional image, and packs the two-dimensional images individually as video frames.

Thereafter, the packing section 112 searches for a position where the evaluation of an intra-prediction result is optimum, on the basis of the evaluations of intra-prediction results, and places the patch at the searched out position. Further, the packing section 112 searches for a position where the evaluation of an intra-prediction result is optimum also in regard to a state in which the patch is rotated and a state in which the patch is inverted.

It is to be noted that the packing section 112 also performs generation of an occupancy map (Occupancy Map) indicative of presence or absence of data at each position and a Dilation process. The packing section 112 supplies various kinds of data subjected to the process to a processing section in a succeeding stage. For example, the packing section 112 supplies a video frame of position information (Geometry) to the video encoding section 114. Further, for example, the packing section 112 supplies a video frame of attribute information (Texture) to the video encoding section 115. Further, for example, the packing section 112 supplies an occupancy map to the OMap encoding section 116.

Further, the packing section 112 supplies control information relating to packing to the multiplexer 117. For example, the packing section 112 generates, as the control information, patch placement information indicative of a position where a patch is placed and supplies the patch placement information to the multiplexer 117. Further, for example, the packing section 112 generates, as the control information, inversion-rotation parameters indicative of a rotation state of a placed patch (whether or not the patch is rotated, and in the case where the patch is rotated, a rotation angle and so forth) and an inversion state (whether or not the patch is inverted, and in the case where the patch is inverted, the inversion direction and so forth), and supplies them to the multiplexer 117.

The auxiliary patch information compression section 113 performs a process relating to compression of auxiliary patch information. For example, the auxiliary patch information compression section 113 acquires data supplied from the patch decomposition section 111. The auxiliary patch information compression section 113 encodes (compresses) auxiliary patch information included in the acquired data. The auxiliary patch information compression section 113 supplies the obtained encoded data of the auxiliary patch information to the multiplexer 117.

The video encoding section 114 performs a process relating to encoding of a video frame of position information (Geometry). For example, the video encoding section 114 acquires a video frame of position information (Geometry) supplied from the packing section 112. Further, the video encoding section 114 encodes the acquired video frame of the position information (Geometry) by any encoding method for a two-dimensional image such as AVC or HEVC, for example. The video encoding section 114 supplies encoded data obtained by the encoding (encoded data of a video frame of position information (Geometry)) to the multiplexer 117.

The video encoding section 115 performs a process relating to encoding of a video frame of attribute information (Texture). For example, the video encoding section 115 acquires a video frame of attribute information (Texture) supplied from the packing section 112. Further, the video encoding section 115 encodes the acquired video frame of the attribute information (Texture) by any encoding method for a two-dimensional image such as AVC or HEVC, for example. The video encoding section 115 supplies encoded data obtained by the encoding (encoded data of a video frame of the attribute information (Texture)) to the multiplexer 117.

The OMap encoding section 116 performs a process relating to encoding of an occupancy map indicative of presence or absence of data of each position. For example, the OMap encoding section 116 acquires an occupancy map supplied from the packing section 112. Further, the OMap encoding section 116 encodes the acquired occupancy map by any encoding method such as arithmetic encoding, for example. The OMap encoding section 116 supplies encoded data of the occupancy map obtained by the encoding to the multiplexer 117.

The multiplexer 117 performs a process relating to multiplexing. For example, the multiplexer 117 acquires encoded data of auxiliary patch information supplied from the auxiliary patch information compression section 113. Further, the multiplexer 117 acquires control information relating to packing supplied from the packing section 112 (including patch placement information and inversion-rotation parameters). Further, the multiplexer 117 acquires encoded data of a video frame of position information (Geometry) supplied from the video encoding section 114. Further, the multiplexer 117 acquires encoded data of a video frame of attribute information (Texture) supplied from the video encoding section 115. Further, the multiplexer 117 acquires encoded data of an occupancy map supplied from the OMap encoding section 116.

The multiplexer 117 multiplexes such acquired information as mentioned above, to generate a bit stream (Bitstream). The multiplexer 117 supplies the generated bit stream to the outside of the encoding apparatus 100.

<Packing Section>

Figure 8:
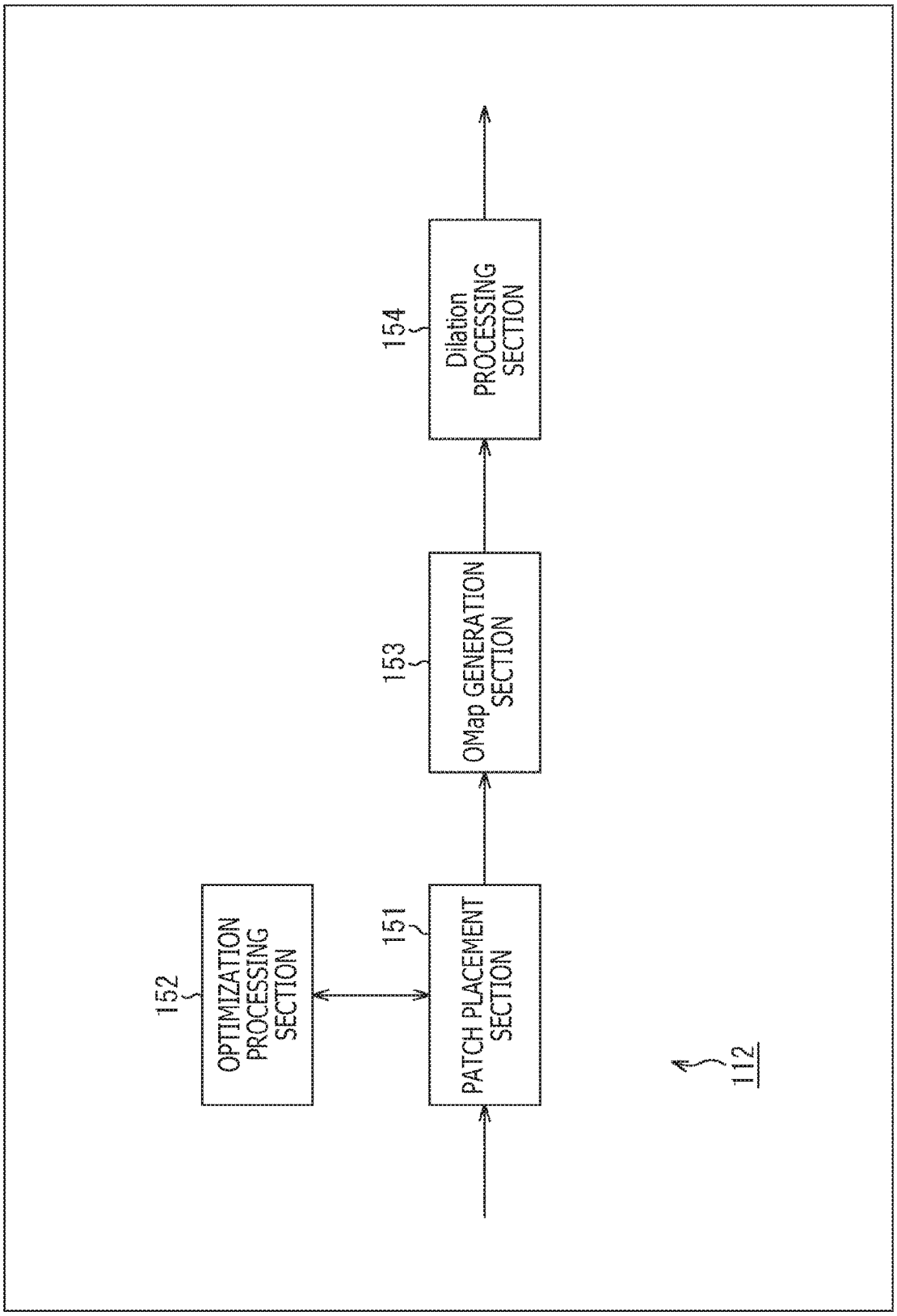
FIG. 8 is a view illustrating an example of principal components of a packing section.

FIG. 8 is a block diagram depicting an example of principal components of the packing section 112. As depicted in FIG. 8, the packing section 112 includes a patch placement section 151, an optimization processing section 152, an OMap generation section 153, and a Dilation processing section 154.

The patch placement section 151 performs a process relating to placement of a patch. For example, the patch placement section 151 acquires data supplied from the patch decomposition section 111. The patch placement section 151 places patches generated by the patch decomposition section 111, in a two-dimensional image. At this time, the patch placement section 151 searches for a position where the evaluation of an intra-prediction result is optimum by using the optimization processing section 152 and places a patch at the searched out position. The patch placement section 151 supplies the two-dimensional image in which such patches are placed to the OMap generation section 153. Further, the patch placement section 151 also supplies control information such as patch placement information and inversion-rotation parameters relating to the placement of the patches to the OMap generation section 153.

The optimization processing section 152 performs a process relating to optimization of the position of a patch. For example, the optimization processing section 152 acquires necessary information from the patch placement section 151 and searches for a position where the evaluation of an intra-prediction result is optimum in regard to placement of a patch by the patch placement section 151. The optimization processing section 152 returns a result of the search to the patch placement section 151.

The OMap generation section 153 performs a process relating to generation of an occupancy map. For example, the OMap generation section 153 acquires data supplied from the patch placement section 151. Further, the OMap generation section 153 generates an occupancy map on the basis of the information. The OMap generation section 153 supplies the data supplied from the patch placement section 151 and the generated occupancy map to the Dilation processing section 154.

The Dilation processing section 154 performs a process relating to a Dilation process. For example, the Dilation processing section 154 acquires data supplied from the OMap generation section 153. Further, the Dilation processing section 154 performs a Dilation process in regard to a two-dimensional image in which patches of position information are placed and another two-dimensional image in which patches of attribute information are placed. For example, the Dilation processing section 154 extends, in a predetermined direction, the pixel value of a contour of each patch placed in a two-dimensional image, to fill up portions of the two dimensional image in which patches are not placed, as in a frame image 30 of FIG. 4B. The Dilation processing section 154 outputs data supplied from the OMap generation section 153 (for example, an occupancy map and so forth), a two-dimensional image subjected to the Dilation process (for example, a video frame of position information and a video frame of attribute information) and so forth.

For example, the Dilation processing section 154 supplies a two-dimensional image that is subjected to the Dilation process and in which patches of position information (Geometry) are placed, as a video frame of position information (Geometry), to the video encoding section 114. Further, the Dilation processing section 154 supplies a two-dimensional image that is subjected to the Dilation process and in which patches of attribute information (Texture) are placed, as a video frame of attribute information (Texture), to the video encoding section 115. Further, the Dilation processing section 154 supplies an occupancy map to the OMap encoding section 116.

Furthermore, the Dilation processing section 154 supplies patch placement information and inversion-rotation parameters, as control information relating to packing, to the multiplexer 117.

<Decoding Apparatus>

Figure 9:
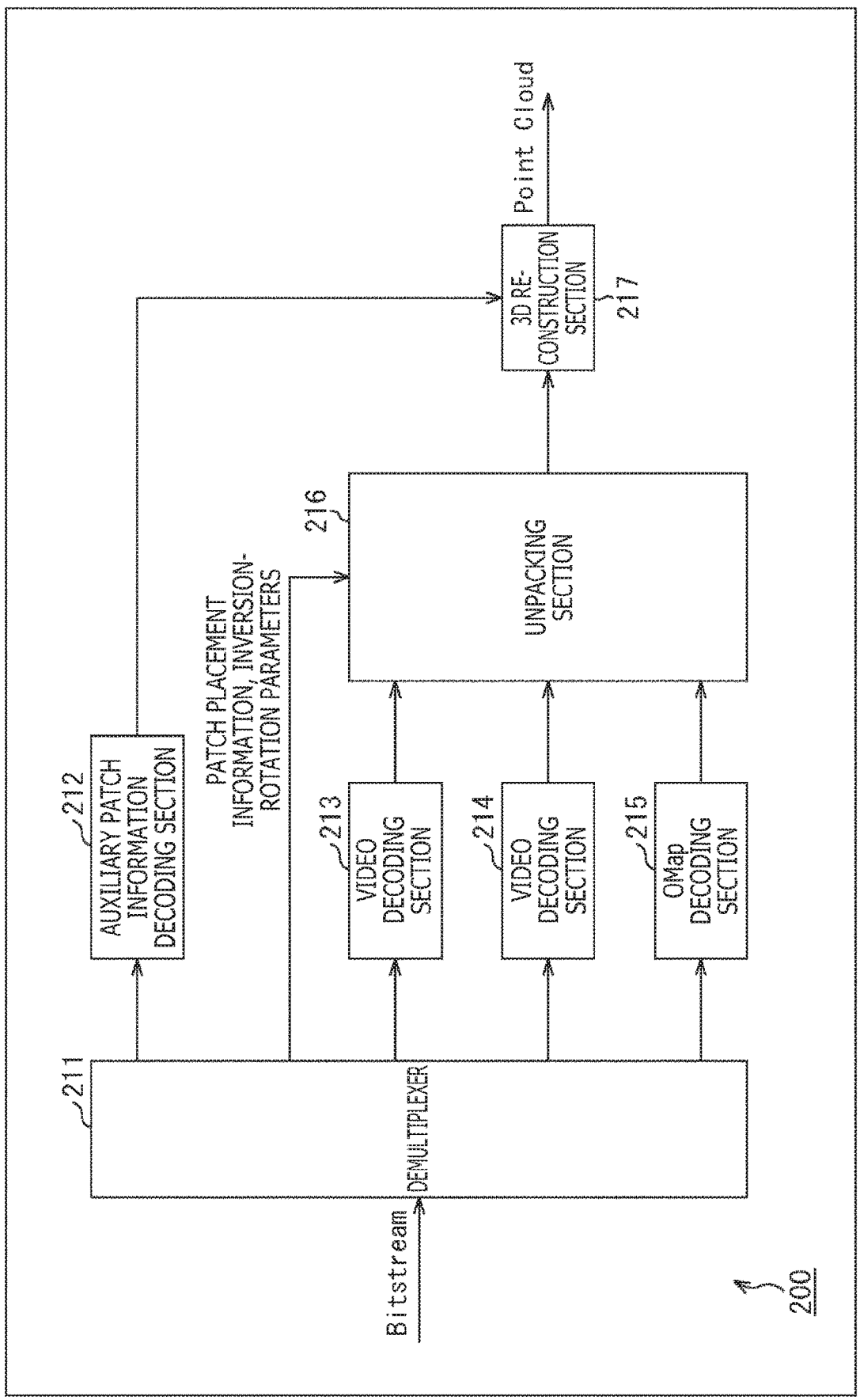
FIG. 9 is a block diagram depicting an example of principal components of a decoding apparatus.

FIG. 9 is a block diagram depicting an example of a configuration of a decoding apparatus that is a mode of the image processing apparatus to which the present technology is applied. The decoding apparatus 200 depicted in FIG. 9 is an apparatus that decodes encoded data obtained by projection and encoding of 3D data such as a point cloud on a two-dimensional plane, by a decoding method for a two-dimensional image, and projects the decoded data in a three-dimensional space (decoding apparatus to which the video-based approach is applied).

It is to be noted that FIG. 9 depicts principal ones of processing sections, data flows and so forth and not all of the processing sections and data flows are depicted in FIG. 9. In other words, the decoding apparatus 200 may include a processing section that is not depicted as a block in FIG. 9 or may include a process or a data flow that is not depicted as an arrow mark or the like in FIG. 9. This similarly applies to the other figures describing processing sections and so forth in the decoding apparatus 200.

As depicted in FIG. 9, the decoding apparatus 200 includes a demultiplexer 211, an auxiliary patch information decoding section 212, a video decoding section 213, another video decoding section 214, an OMap decoding section 215, an unpacking section 216, and a 3D re-construction section 217.

The demultiplexer 211 performs a process relating to demultiplexing of data. For example, the demultiplexer 211 acquires a bit stream inputted to the decoding apparatus 200. This bit stream is supplied, for example, from the encoding apparatus 100. The demultiplexer 211 demultiplexes the bit stream to extract encoded data of auxiliary patch information and supplies the encoded data to the auxiliary patch information decoding section 212. Further, the demultiplexer 211 extracts encoded data of a video frame of position information (Geometry) from the bit stream by demultiplexing and supplies the encoded data to the video decoding section 213. Further, the demultiplexer 211 extracts encoded data of a video frame of attribute information (Texture) from the bit stream by demultiplexing and supplies the encoded data to the video decoding section 214. Further, the demultiplexer 211 extracts encoded data of an occupancy map from the bit stream by demultiplexing and supplies the encoded data to the OMap decoding section 215.

Furthermore, the demultiplexer 211 supplies control information relating to packing including patch placement information and inversion-rotation parameters to the unpacking section 216.

The auxiliary patch information decoding section 212 performs a process relating to decoding of encoded data of auxiliary patch information. For example, the auxiliary patch information decoding section 212 acquires encoded data of auxiliary patch information supplied from the demultiplexer 211. Further, the auxiliary patch information decoding section 212 decodes the encoded data of the auxiliary patch information included in the acquired data. The auxiliary patch information decoding section 212 supplies the auxiliary patch information obtained by the decoding to the 3D re-construction section 217.

The video decoding section 213 performs a process relating to decoding of encoded data of a video frame of position information (Geometry). For example, the video decoding section 213 acquires encoded data of a video frame of position information (Geometry) supplied from the demultiplexer 211. Further, the video decoding section 213 decodes the encoded data acquired from the demultiplexer 211, to obtain a video frame of the position information (Geometry). The video decoding section 213 supplies the video frame of the position information (Geometry) to the unpacking section 216.

The video decoding section 214 performs a process relating to decoding of encoded data of a video frame of attribute information (Texture). For example, the video decoding section 214 acquires encoded data of a video frame of attribute information (Texture) supplied from the demultiplexer 211. Further, the video decoding section 214 decodes the encoded data acquired from the demultiplexer 211, to obtain a video frame of the attribute information (Texture). The video decoding section 214 supplies the video frame of the attribute information (Texture) to the unpacking section 216.

The OMap decoding section 215 performs a process relating to decoding of encoded data of an occupancy map. For example, the OMap decoding section 215 acquires encoded data of an occupancy map supplied from the demultiplexer 211. Further, the OMap decoding section 215 decodes encoded data acquired from the demultiplexer 211, to obtain an occupancy map. The OMap decoding section 215 supplies the occupancy map to the unpacking section 216.

The unpacking section 216 performs a process relating to unpacking. For example, the unpacking section 216 acquires a video frame of position information (Geometry) from the video decoding section 213, acquires a video frame of attribute information (Texture) from the video decoding section 214, and acquires an occupancy map from the OMap decoding section 215. Further, the unpacking section 216 acquires control information relating to packing including patch placement information and inversion-rotation parameters supplied from the demultiplexer 211.

The unpacking section 216 unpacks a video frame of position information and a video frame of attribute information on the basis of control information relating to packing (patch placement information and inversion-rotation parameters). The unpacking section 216 supplies various kinds of data of patches of position information (Geometry) and patches of attribute information (Texture) obtained by unpacking as well as various kinds of data of an occupancy map and so forth to the 3D re-construction section 217.

The 3D re-construction section 217 performs a process relating to re-construction of 3D data. For example, the 3D re-construction section 217 re-constructs 3D data (Point Cloud) on the basis of auxiliary patch information supplied from the auxiliary patch information decoding section 212 and patches of position information (Geometry), patches of attribute information (Texture), an occupancy map and so forth supplied from the unpacking section 216. The 3D re-construction section 217 outputs the 3D data obtained by such processes as described above to the outside of the decoding apparatus 200.

The 3D data is supplied, for example, to a display section such that an image thereof is displayed, recorded on a recording medium, or supplied to a different apparatus through communication.

By the provision of such components as described above, patches can be placed in and packed in a frame image on the basis of evaluations of results of prediction. Further, on the basis of the patch placement information, encoded data of a frame image in which patches are placed and packed on the basis of the evaluations of results of prediction can be decoded correctly. Accordingly, the prediction accuracy can be improved, and the encoding efficiency of a 2D moving image codec can be improved. In other words, reduction of the encoding efficiency can be suppressed.

<Flow of Encoding Process>

Now, an example of a flow of an encoding process executed by the encoding apparatus 100 is described with reference to a flowchart of FIG. 10.

When the encoding process is started, the patch decomposition section 111 of the encoding apparatus 100 projects 3D data on a two-dimensional plane to decompose the 3D data into patches in step S101.

In step S102, the auxiliary patch information compression section 113 compresses auxiliary patch information obtained by the process in step S101.

In step S103, the packing section 112 places the patches generated in step S101 in the two-dimensional image, to pack them as a video frame.

In step S104, the video encoding section 114 encodes a geometry video frame that is a video frame of position information obtained by the process in step S103, by an encoding method for a two-dimensional image.

In step S105, the video encoding section 115 encodes a color video frame that is a video frame of attribute information obtained by the process in step S103, by an encoding method for a two-dimensional image.

In step S106, the OMap encoding section 116 encodes an occupancy map obtained by the process in step S103, by a predetermined encoding method.

In step S107, the multiplexer 117 multiplexes the various kinds of information generated in such a manner as described above, to generate a bit stream including the information. In particular, this bit stream includes the encoded data of the position information, attribute information, occupancy map and so forth and further includes control information relating to packing (including patch placement information and inversion-rotation parameters).

In step S108, the multiplexer 117 outputs the bit stream generated by the process in step S107 to the outside of the encoding apparatus 100.

When the process in step S108 ends, the encoding process ends.

<Flow of Packing Process>

Figure 10:
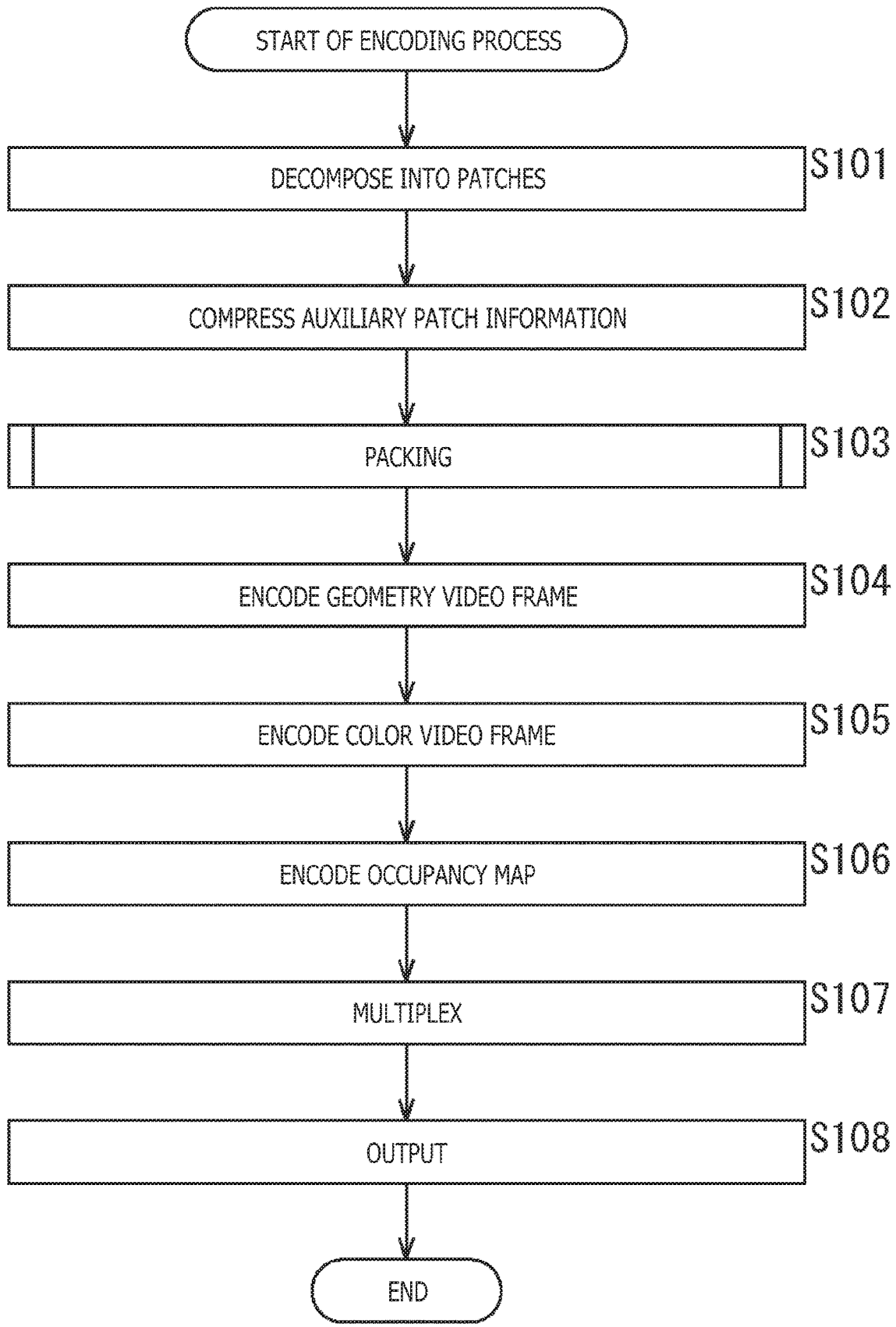
FIG. 10 is a flowchart illustrating an example of a flow of an encoding process.

Now, an example of a flow of the packing process executed in step S103 of FIG. 10 is described with reference to a flowchart of FIG. 11.

When the packing process is started, the patch placement section 151 selects a non-processed patch as a processing target (current patch) in step S121.

In step S122, the patch placement section 124 specifies a region in a two-dimensional image in which the current patch can be placed.

In step S123, the optimization processing section 152 searches for a position optimum for placement of the current patch. After the search ends, the processing advances to step S124.

In step S124, the patch placement section 151 determines whether or not the search has been performed in a state in which the current patch is inverted in regard to all inversion directions. In the case where it is determined that there remains an inversion direction in regard to which the search process has not been performed, the processing advances to step S125.

In step S125, the patch placement section 151 inverts the patch in the inversion direction in regard to which the search process has not been performed. After the process in step S125 ends, the processing returns to step S122, and the subsequent processes are repeated. In short, the processes in step S122 to step S125 are executed in regard to the individual inversion directions. Then, in the case where it is determined in step S124 that the search has been performed in all inversion states, the processing advances to step S126.

In step S126, the patch placement section 151 determines whether or not the search has been performed in a state in which the current patch is rotated in all rotation angles. In the case where it is determined that there remains a rotation angle for which the process has not been performed, the processing advances to step S127.

In step S127, the patch placement section 151 rotates the patch by the rotation angle for which the process has not been performed. After the process in step S127 ends, the processing returns to step S122, and the subsequent processes are repeated. In short, in regard to each rotation angle, the processes in step S122 to step S127 are executed. Then, in the case where it is determined in step S126 that the search has been performed in all rotation states, the processing advances to step S128.

In step S128, the patch placement section 151 places the current patch at the optimum position searched out in step S123.

In step S129, the patch placement section 151 determines whether or not all patches have been placed in the two-dimensional image. In the case where it is determined that there remains a non-processed patch, the processing returns to step S121, and the subsequent processes are executed. In short, the processes in step S121 to step S129 are executed. Then, in the case where it is determined in step S129 that all patches have been placed, the processing advances to step S130.

In step S130, the patch placement section 151 generates patch placement information in regard to the placed patches.

In step S131, the patch placement section 151 sets inversion-rotation parameters for each of the placed patches.

In step S132, the OMap generation section 153 generates an occupancy map.

In step S133, the Dilation processing section 154 performs a Dilation process for the two-dimensional image in which the patches of position information are placed and the two-dimensional image in which the patches of attribute information are placed.

When the process in step S133 ends, the packing process ends and the processing returns to FIG. 10.

<Flow of Optimum Position Search Process>

Figure 11:
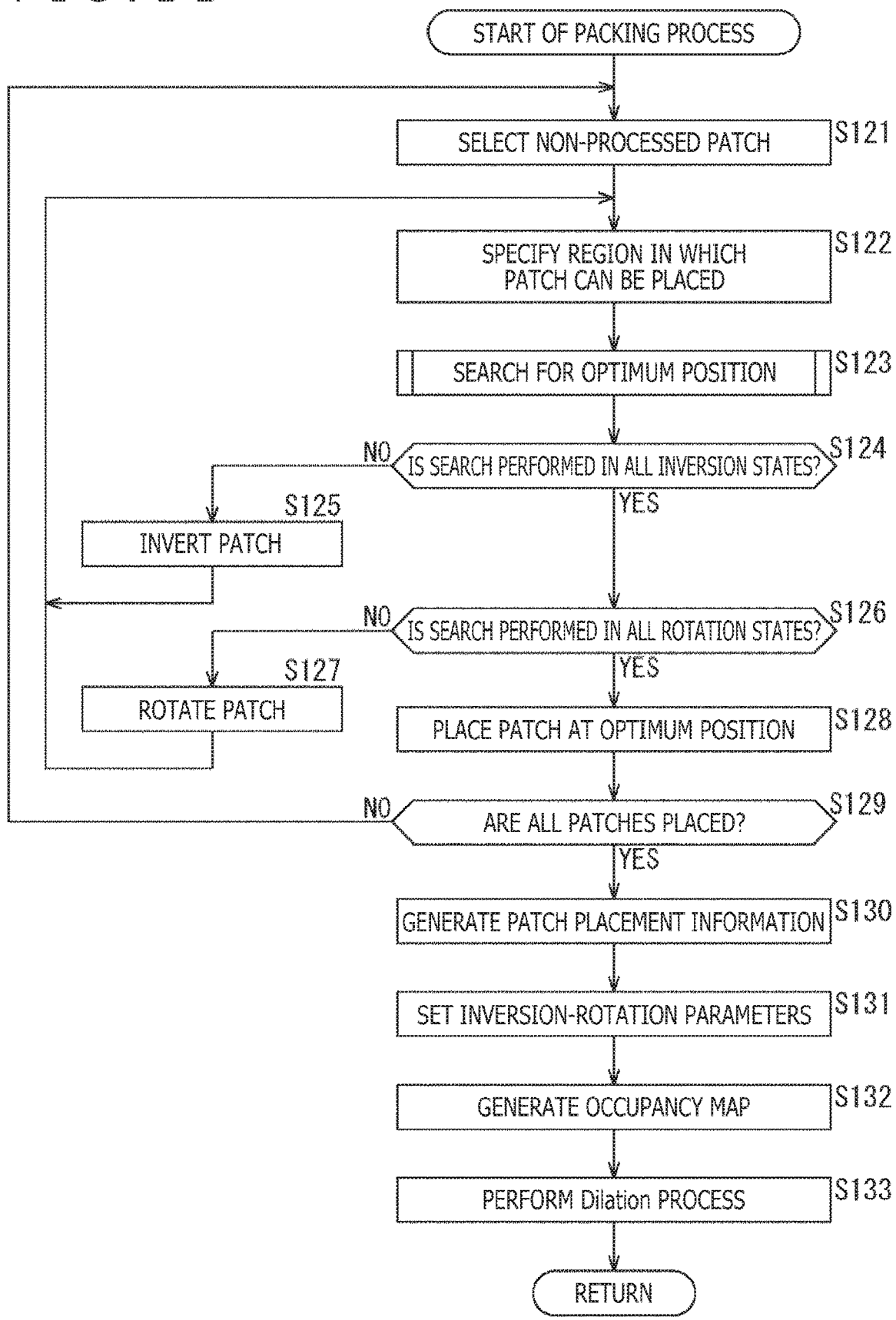
FIG. 11 is a flowchart illustrating an example of a flow of a packing process.
Figure 12:
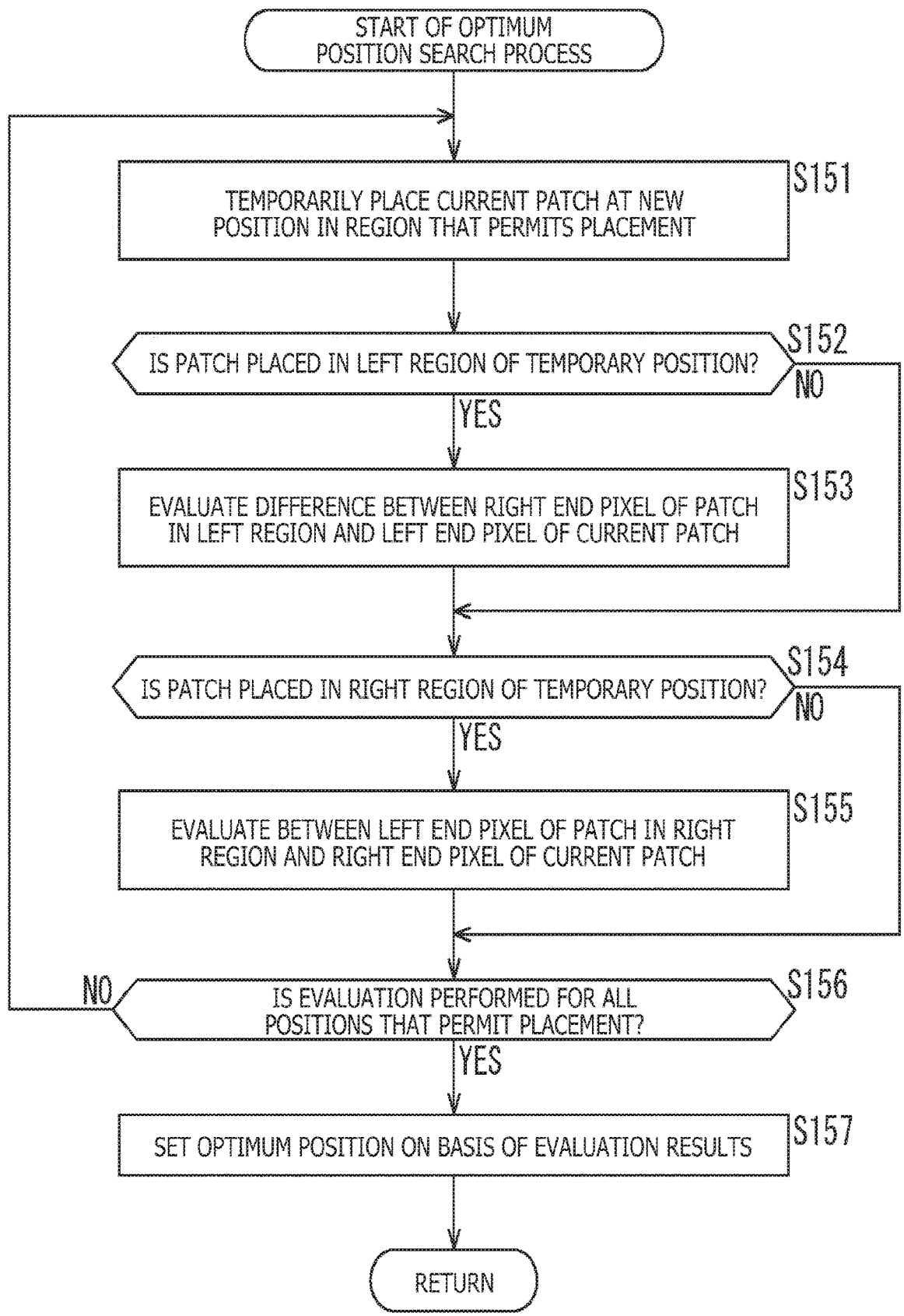
FIG. 12 is a flowchart illustrating an example of a flow of an optimum position search process.

Now, an example of a flow of the optimum position search process executed in step S123 of FIG. 11 is described with reference to a flowchart of FIG. 12.

When the optimum position search process is started, in step S151, the optimization processing section 152 temporarily places the current patch at a new position in the region of the two-dimensional image in which it can be placed.

In step S152, the optimization processing section 152 determines whether or not a patch is placed in a region on the left side (left region) of the position at which the current patch is temporarily placed (temporary position) in the two-dimensional image. In the case where it is determined that a patch exists in the left region of the temporary position, the processing advances to step S153.

In step S153, the optimization processing section 152 evaluates the difference between a pixel at the right end of a patch in the left region and a pixel at the left end of the current patch. After the process in step S153 ends, the processing advances to step S154. On the other hand, in the case where it is determined in step S152 that a patch does not exist in the left region of the temporary position, the processing advances to step S154.

In step S154, the optimization processing section 152 determines whether or not a patch is placed in a region on the right side (right region) of the position (temporary position) where the current patch is temporarily placed in the two-dimensional image. In the case where it is determined that a patch exists in the right region of the temporary position, the processing advances to step S155.

In step S155, the optimization processing section 152 evaluates the difference between a pixel at the left end of a patch in the right region and a pixel at the right end of the current patch. After the process in step S155 ends, the processing advance to step S156. On the other hand, in the case where it is determined in step S154 that a patch does not exist in the right region of the temporary position, the processing advances to step S156.

In step S156, the optimization processing section 152 determines whether or not the evaluation has been performed for all of the positions where a patch can be placed. In the case where it is determined that there remains a position for which the process has not been performed, the processing returns to step S151, and the subsequent processes are repeated. In short, the processes in step S151 to step S156 are executed for the positions where a patch can be placed. Then, in the case where it is determined in step S156 that the evaluation has been performed for all the positions, the processing advances to step S157.

In step S157, the optimization processing section 152 sets an optimum position on the basis of the evaluation results obtained in such a manner as described above. For example, the optimization processing section 152 sets a position at which the prediction accuracy is highest, i.e., a position at which the difference described above indicates a minimum value, as an optimum position.

When the process in step S157 ends, the optimum position search process ends, and the processing returns to FIG. 11.

By executing the processes in such a manner as described above, the encoding apparatus 100 can place and pack patches in a frame image on the basis of evaluations of results of prediction. As a result, patches can be placed so as to improve the prediction accuracy. Accordingly, the encoding efficiency of a 2D moving image codec can be improved. In other words, reduction of the encoding efficiency can be suppressed.

Figure 13:
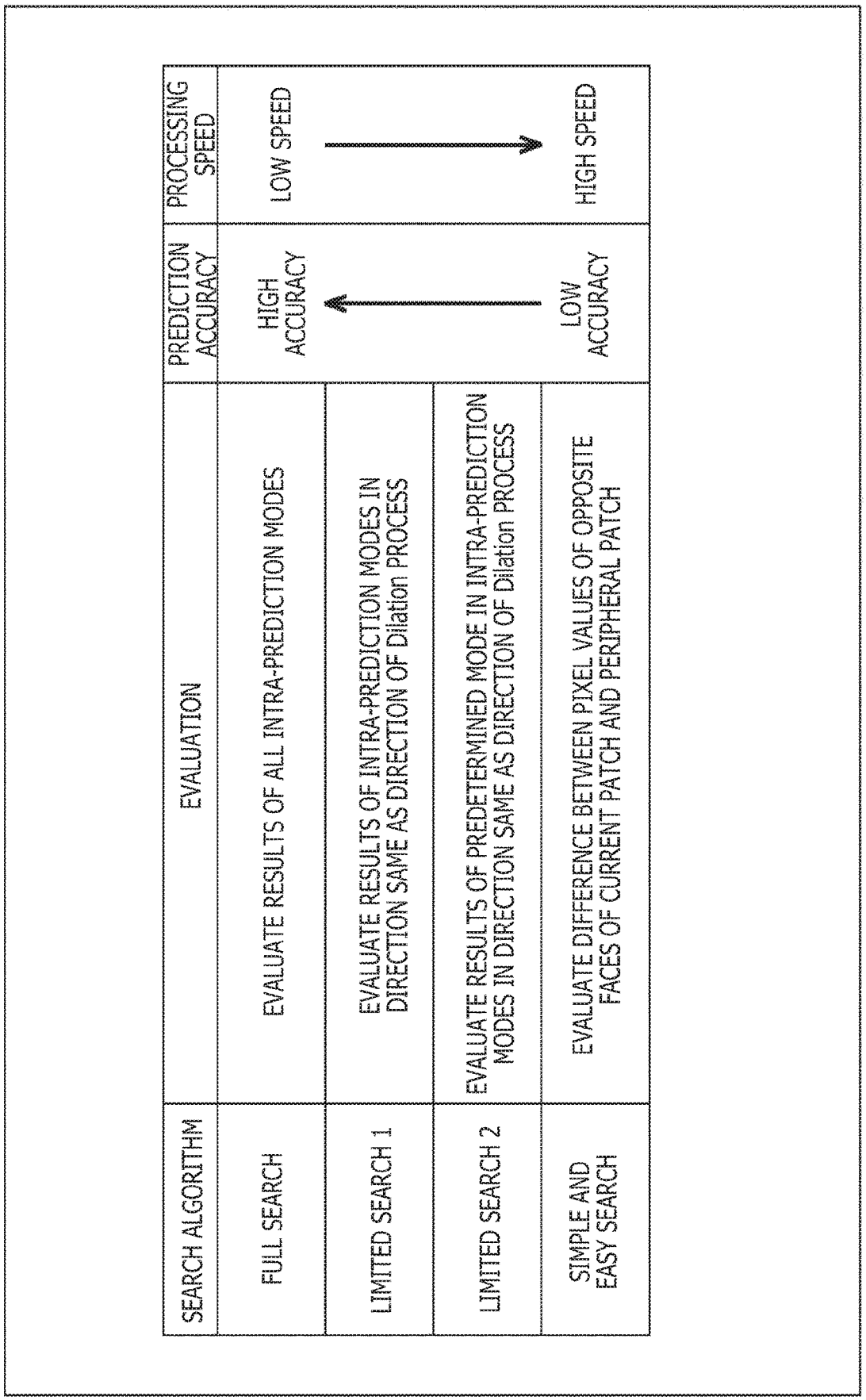
FIG. 13 is a view illustrating an example of a search algorithm.

It is to be noted that, while a case in which a simple and easy method (simple and easy search) of evaluating the difference between pixel values of opposite faces of a current patch and a peripheral patch is used for evaluation is described with reference to FIG. 12, the evaluation method can be selected freely as described above and is not limited to this example. For example, the evaluation method may be a method (full search) of performing intra-prediction in all modes and evaluating results of the prediction as depicted in FIG. 13, a method (limited search 1) of performing intra-prediction in modes in a direction that is the same as the direction of a Dilation process and evaluating results of the prediction, or a method (limited search 2) of performing intra-prediction in a predetermined mode (for example, INTRA_ANGULAR10) among modes in a direction that is the same as the direction of a Dilation process and evaluating results of the prediction.

Comparing the methods described above, generally, the prediction accuracy is highest in the full search, second highest in the limited search 1, third highest in the limited search 2, and lowest in the simple and easy search. The processing speed is highest in the simple and easy search, second highest in the limited search 2, third highest in the limited search 1, and lowest in the full search.

<Flow of Decoding Process>

Figure 14:
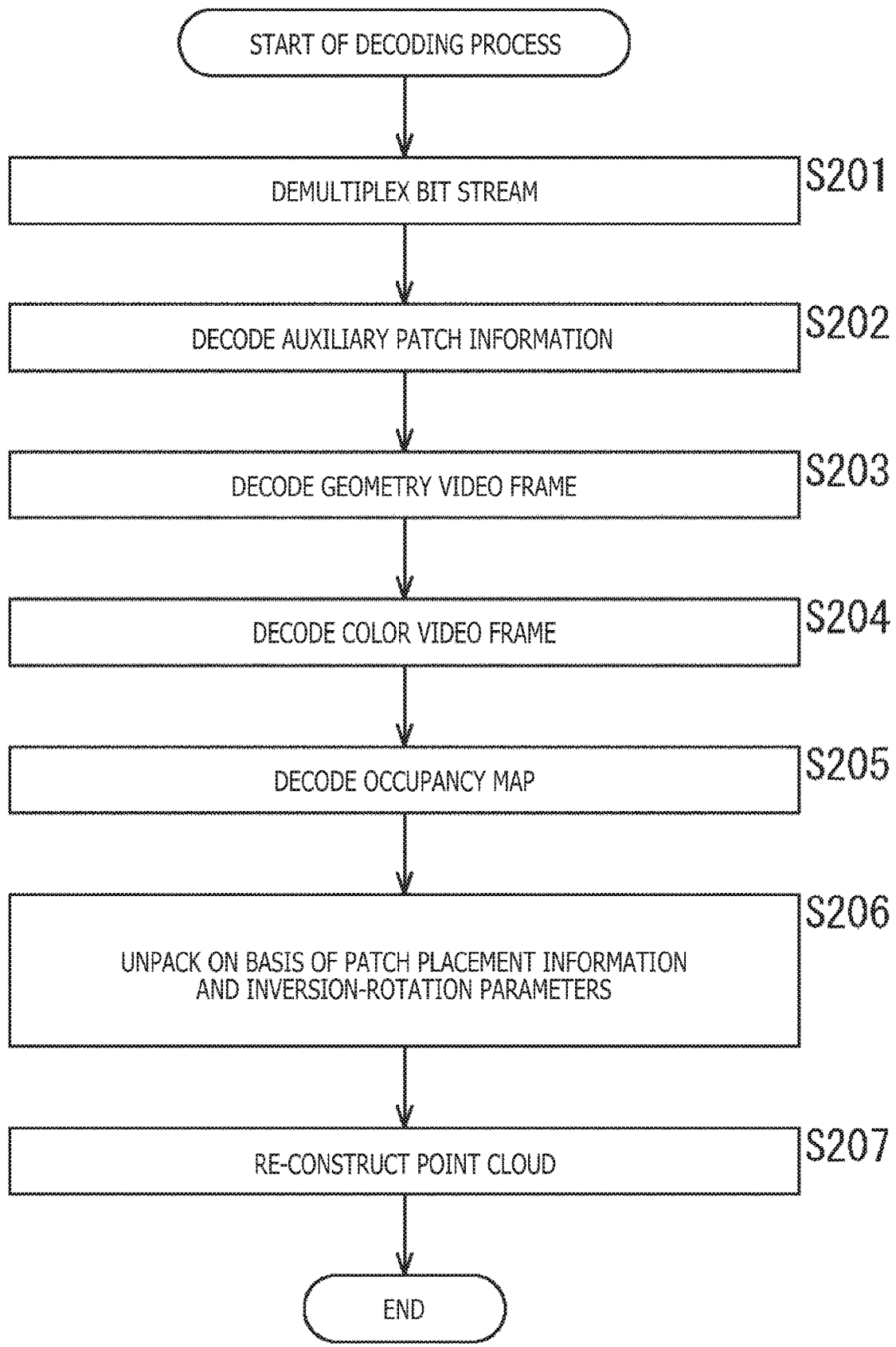
FIG. 14 is a flowchart illustrating an example of a flow of a decoding process.

Now, an example of a flow of a decoding process executed by the decoding apparatus 200 is described with reference to a flowchart of FIG. 14.

When the decoding process is started, the demultiplexer 211 of the decoding apparatus 200 demultiplexes a bit stream in step S201.

In step S202, the auxiliary patch information decoding section 212 decodes auxiliary patch information extracted from the bit stream in step S201.

In step S203, the video decoding section 213 decodes encoded data of a geometry video frame (video frame of position information) extracted from the bit stream in step S201.

In step S204, the video decoding section 214 decodes encoded data of a color video frame (video frame of position information) extracted from the bit stream in step S201.

In step S205, the OMap decoding section 215 decodes encoded data of an occupancy map extracted from the bit stream in step S201.

In step S206, the unpacking section 216 unpacks the geometry video frame and the color video frame on the basis of control information relating to packing (including patch placement information and inversion-rotation parameters) extracted from the bit stream in step S201, to extract patches.

In step S207, the 3D re-construction section 217 re-constructs 3D data of, for example, a point cloud and so forth on the basis of the auxiliary patch information obtained in step S202, the patches obtained in step S206 and so forth.

When the process in step S207 ends, the decoding process ends.

By performing the decoding process in such a manner as described above, the decoding apparatus 200 can correctly decode encoded data of a frame image in which patches are placed and packed on the basis of evaluations of results of prediction, on the basis of patch placement information. As a result, improvement of the prediction accuracy can be implemented. Accordingly, the encoding efficiency of a 2D moving image codec can be improved. In other words, reduction of the encoding efficiency can be suppressed.

3. Second Embodiment

<Encoding Apparatus>

Figure 15:
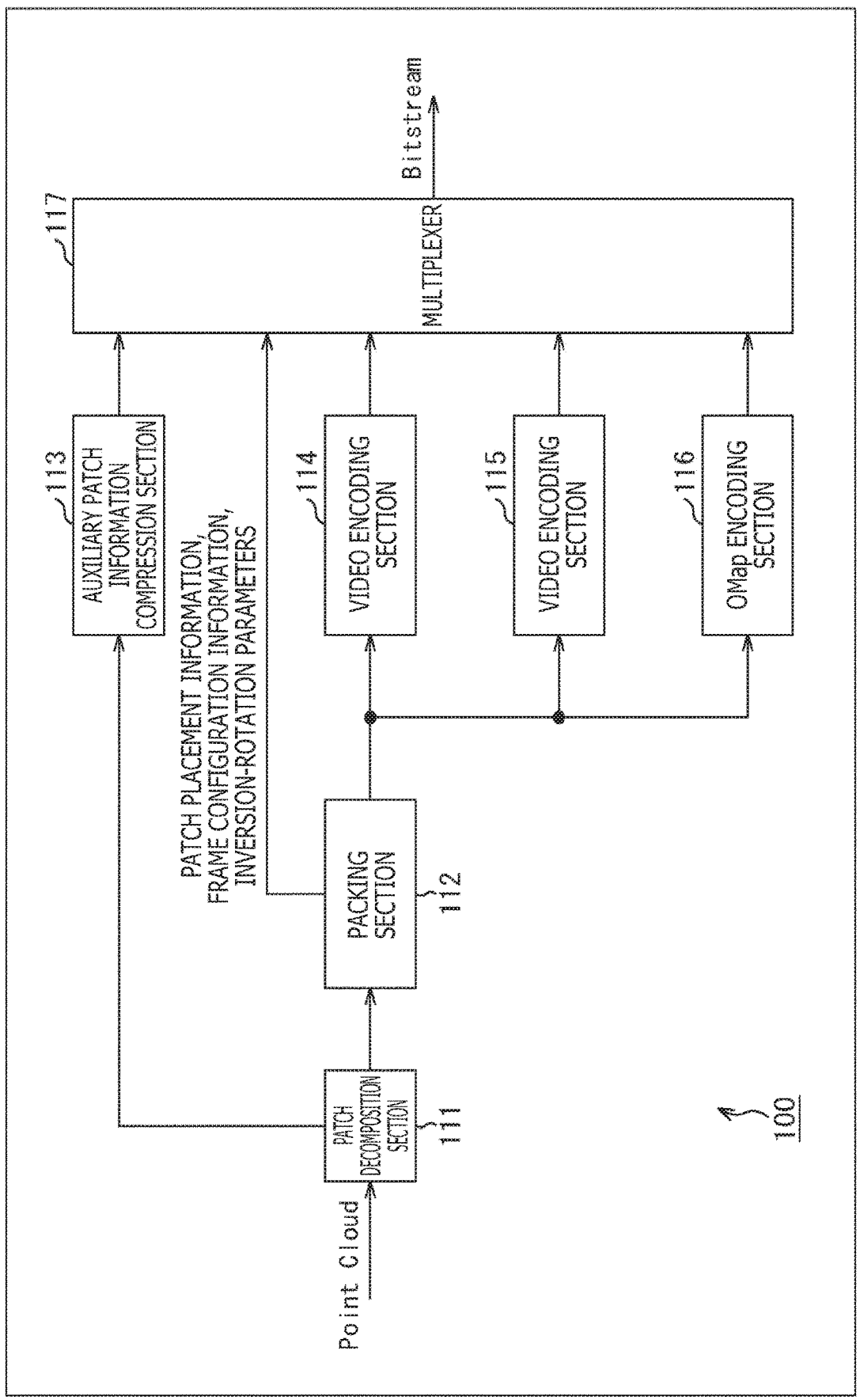
FIG. 15 is a block diagram depicting an example of principal components of an encoding apparatus.

Described next is a case in which a frame image that is optimum in evaluation of an inter-prediction result is searched for and a patch is placed in the searched out frame image. FIG. 15 is a block diagram depicting an example of principal components of an encoding apparatus 100 in such case. As depicted in FIG. 15, also in this case, the encoding apparatus 100 has a configuration basically similar to that of the case of FIG. 7.

However, upon packing, the packing section 112 searches for a frame image that is optimum in evaluation of an inter-prediction result, on the basis of evaluations of inter-prediction results, and a patch is placed in the searched out frame image.

To this end, the packing section 112 generates frame configuration information indicative of a configuration of a frame image in which patches are placed, in addition to patch placement information and inversion-rotation parameters, as control information relating to packing, and supplies the generated frame configuration information to the multiplexer 117.

The multiplexer 117 multiplexes the control information relating to packing (including the patch placement information, inversion-rotation parameters, and frame configuration information) with encoded data of video frames and an occupancy map and so forth to generate a bit stream (Bitstream). The multiplexer 117 outputs the generated bit stream to the outside of the encoding apparatus 100.

It is to be noted that, also in this case, the packing section 112 has a configuration similar to that of the case of FIG. 8. However, in this case, the optimization processing section 152 acquires necessary information from the patch placement section 151 and searches for a frame image that is optimum in evaluation of an inter-prediction result in regard to placement of a patch by the patch placement section 151. The optimization processing section 152 returns a result of the search to the patch placement section 151.

The patch placement section 151 places a patch in the frame image searched out by the optimization processing section 152 as being optimum in evaluation of an intra-prediction result. Further, the patch placement section 151 generates frame configuration information in addition to the patch placement information and the inversion-rotation parameters, as control information relating to packing.

<Decoding Apparatus>

Figure 16:
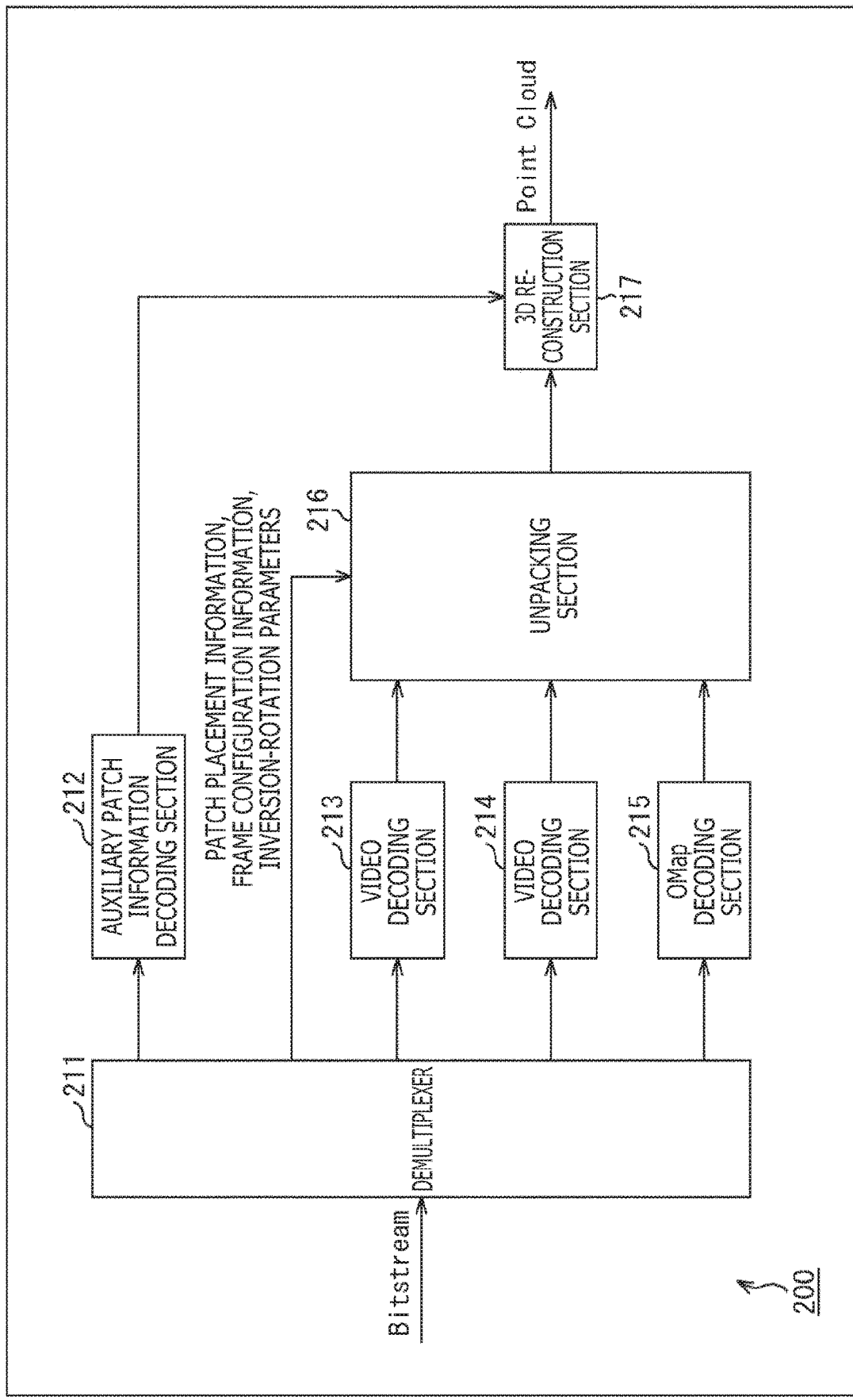
FIG. 16 is a block diagram depicting an example of principal components of a decoding apparatus.

FIG. 16 is a block diagram depicting an example of principal components of the decoding apparatus 200. As depicted in FIG. 16, also in this case, the decoding apparatus 200 has a configuration basically similar to that of the case of FIG. 9.

However, the demultiplexer 211 supplies control information relating to packing including patch placement information, inversion-rotation parameters, and frame configuration information and extracted from a bit stream by demultiplexing to the unpacking section 216.

The unpacking section 216 unpacks a video frame of position information (Geometry) and a video frame of attribute information (Texture) on the basis of control information relating to packing (including patch placement information, inversion-rotation parameters, and frame configuration information). The unpacking section 216 supplies patches of the position information (Geometry) and patches of the attribute information (Texture) as well as various kinds of data of an occupancy map and so forth obtained by the unpacking to the 3D re-construction section 217.

Since the unpacking section 216 has such a configuration as just described, it is possible to place and pack patches in a frame image on the basis of evaluations of results of prediction. Further, encoded data of a frame image in which patches are placed and packed on the basis of evaluations of results of prediction can be decoded correctly on the basis of the patch placement information. Accordingly, the prediction accuracy can be improved, and the encoding efficiency of a 2D moving picture codec can be improved. In other words, reduction of the encoding efficiency can be suppressed.

<Flow of Packing Process>

Also in the case of inter-prediction, the encoding process is executed similarly as in the case of the first embodiment (FIG. 10).

A flow of the packing process in this case is described with reference to a flowchart of FIG. 17. When the packing process is started, the patch placement section 151 selects a non-processed patch as a processing target (current patch) in step S301.

In step S302, the patch placement section 124 specifies a frame in which the current patch can be placed in a two-dimensional image.

In step S303, the optimization processing section 152 searches for a frame optimum for placement of the current patch. After the search ends, the processing advances to step S304.

In step S304, the patch placement section 151 determines whether or not search has been performed in a state in which the current patch is inverted in all inversion directions. In the case where it is determined that there remains an inversion direction for which the process has not been performed, the processing advances to step S305.

In step S305, the patch placement section 151 inverts the patch in the direction in which the process has not been performed. After the process in step S305 ends, the processing returns to step S302, and the subsequent processes are repeated. In short, the processes in step S302 to step S305 are executed in regard to each inversion direction. Then, in the case where it is determined in step S304 that the search has been performed in all inversion states, the processing advances to step S306.

In step S306, the patch placement section 151 determines whether or not the search has been performed in a state in which the current patch is rotated at all rotation angles. In the case where it is determined that there remains a rotation angle in regard to which the process has not been performed, the processing advances to step S307.

In step S307, the patch placement section 151 rotates the patch at the rotation angle in regard to which the process has not been performed. After the process in step S307 ends, the processing returns to step S302, and the subsequent processes are repeated. In short, the processes in step S302 to step S307 are executed for each rotation angle. Then, in the case where it is determined in step S306 that the search has been performed in all rotation states, the processing advances to step S308.

In step S308, the patch placement section 151 places the current patch in the optimum frame image searched out in step S303.

In step S309, the patch placement section 151 determines whether or not all patches are placed in the two-dimensional image. In the case where there remains a non-processed patch, then, the processing returns to step S301, and the subsequent processes are executed. In short, the processes in step S301 to step S309 are executed for each patch. Then, in the case where it is determined in step S309 that all patches are placed, the processing advances to step S310.

In step S310, the patch placement section 151 generates patch placement information in regard to the placed patches.

In step S311, the patch placement section 151 sets inversion-rotation parameters for each of the placed patches.

In step S312, the patch placement section 151 sets frame configuration information regarding the frame images in which the patches are placed.

In step S313, the OMap generation section 153 generates an occupancy map.

In step S314, the Dilation processing section 154 performs a Dilation process for the two-dimensional image in which the patches of the position information are placed and the two-dimensional image in which the patches of the attribute information are placed.

When the process in step S314 ends, the packing process ends, and the processing returns to FIG. 10.

<Flow of Optimum Frame Search Process>

Figure 17:
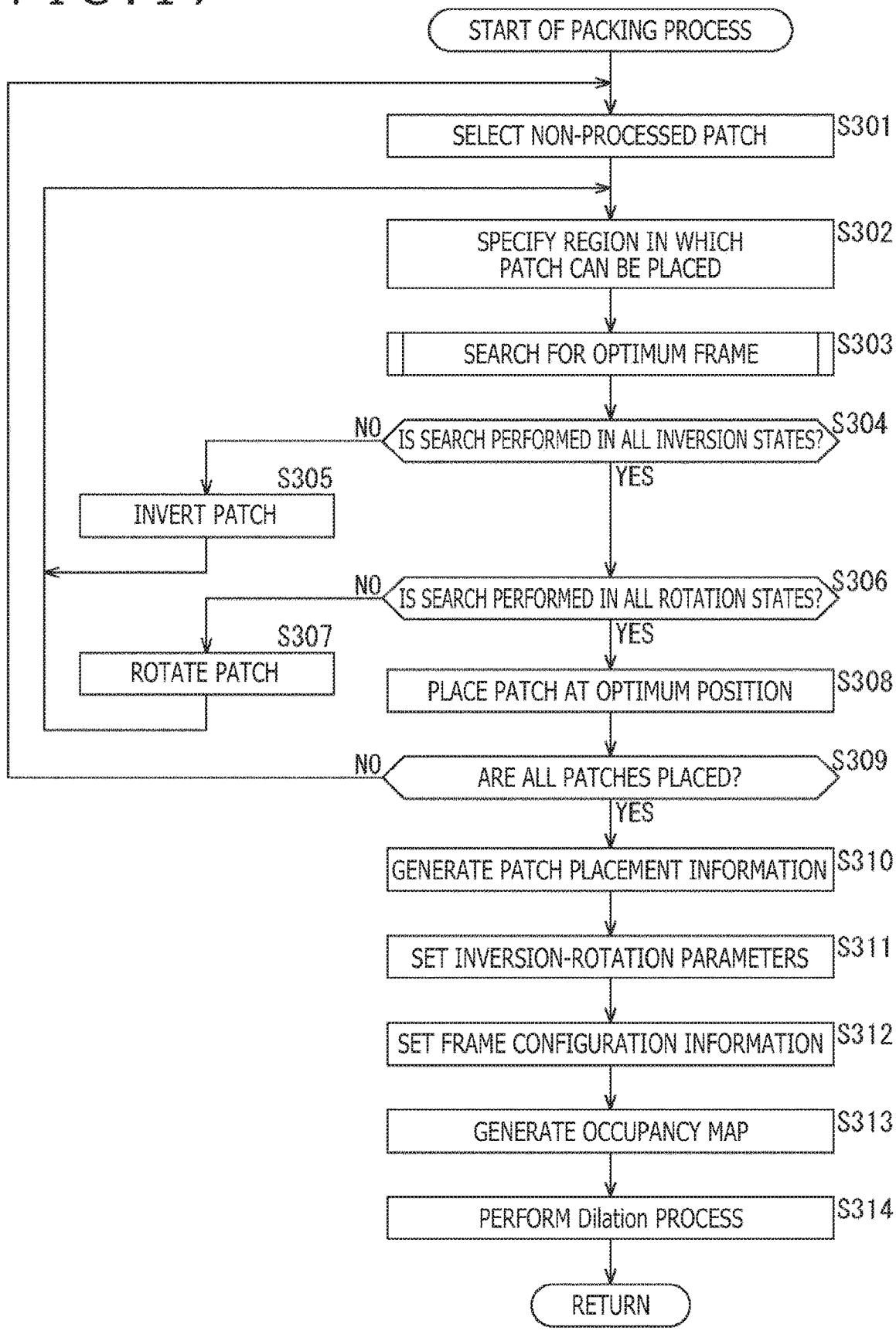
FIG. 17 is a flowchart illustrating an example of a flow of a packing process.
Figure 18:
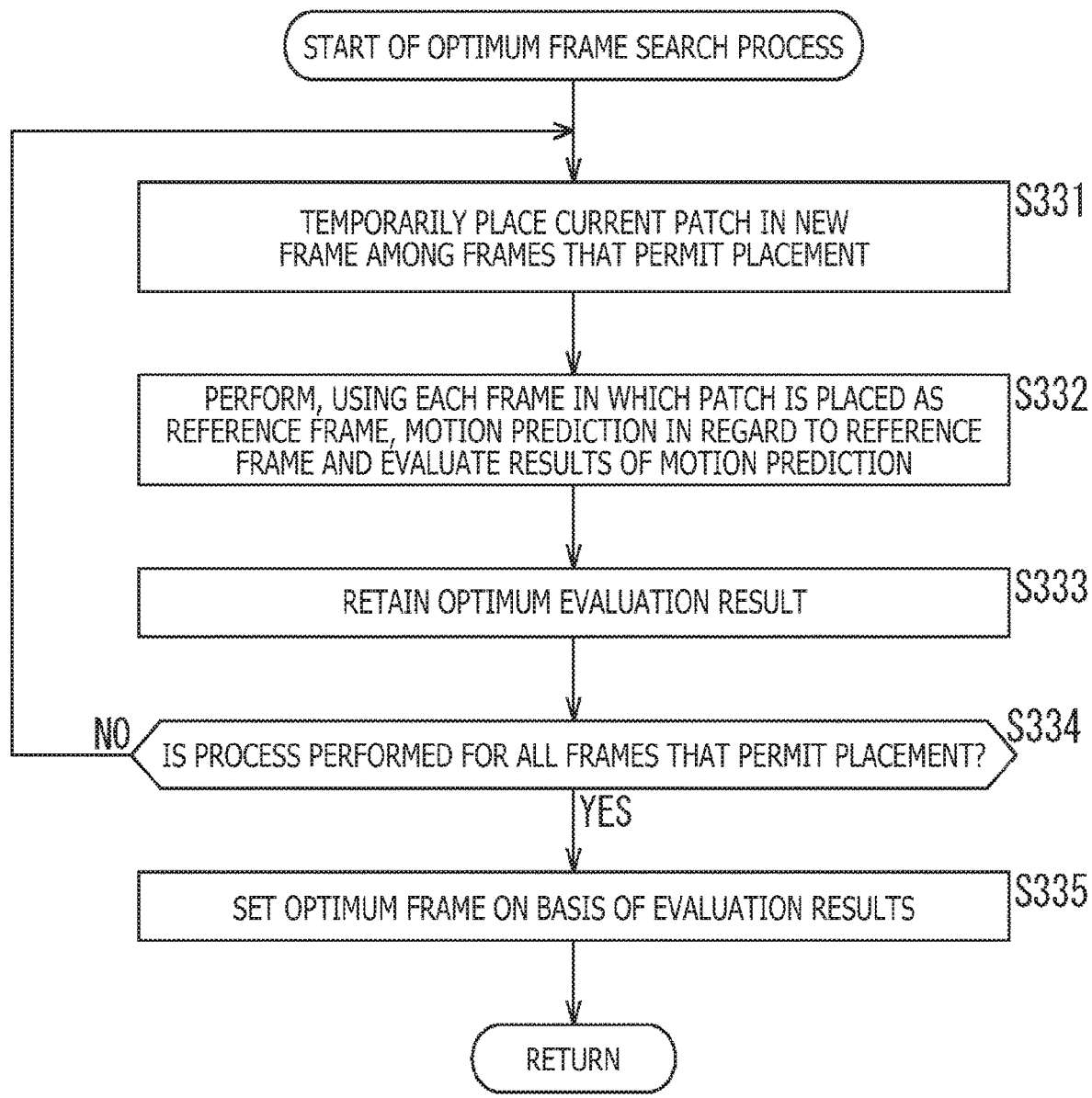
FIG. 18 is a flowchart illustrating an example of a flow of an optimum frame search process.

Now, an example of a flow of the optimum frame search process executed in step S303 of FIG. 17 is described with reference to a flowchart of FIG. 18.

When the optimum frame search process is started, in step S331, the optimization processing section 152 temporarily places a current patch in a new frame image among frame images in which it can be placed.

In step S332, using, as a reference frame, each of frame images in which a patch is already placed and that is different from the frame image in which the current patch is placed, the optimization processing section 152 performs motion prediction in regard to the reference images and evaluates a result of the prediction. In other words, a result of inter-prediction is evaluated for each reference frame.

In step S333, the optimization processing section 152 retains an optimum evaluation result from among the evaluations of the inter-prediction results of the reference frames.

In step S334, the optimization processing section 152 determines whether or not evaluation has been performed in regard to all frames that permit placement of a patch therein. In the case where it is determined that there remains a non-processed frame in which a patch is not temporarily placed, the processing returns to step S331, and the subsequent processes are executed. In short, the processes in step S331 to step S334 are executed for each of the frame images that permit placement of a patch therein. Then, in the case where it is determined in step S334 that evaluation has been performed in regard to all frame images that permit placement of a patch (an optimum evaluation result has been acquired for each frame image in which a patch is temporarily placed), the processing advances to step S335.

In step S335, the optimization processing section 152 sets an optimum position on the basis of evaluation results obtained in such a manner as described above. For example, the optimization processing section 152 sets, among the evaluation results retained therein, a frame image having the highest prediction accuracy as an optimum frame image.

When the process in step S335 ends, the optimum frame search process ends, and the processing returns to FIG. 17.

By executing the processes in such a manner as described above, the encoding apparatus 100 can place and pack patches in frame images on the basis of evaluations of results of prediction. As a result, patches can be placed so as to improve the prediction accuracy. Accordingly, the encoding efficiency of a 2D moving image codec can be improved. In other words, reduction of the encoding efficiency can be suppressed.

<Flow of Decoding Process>

Figure 19:
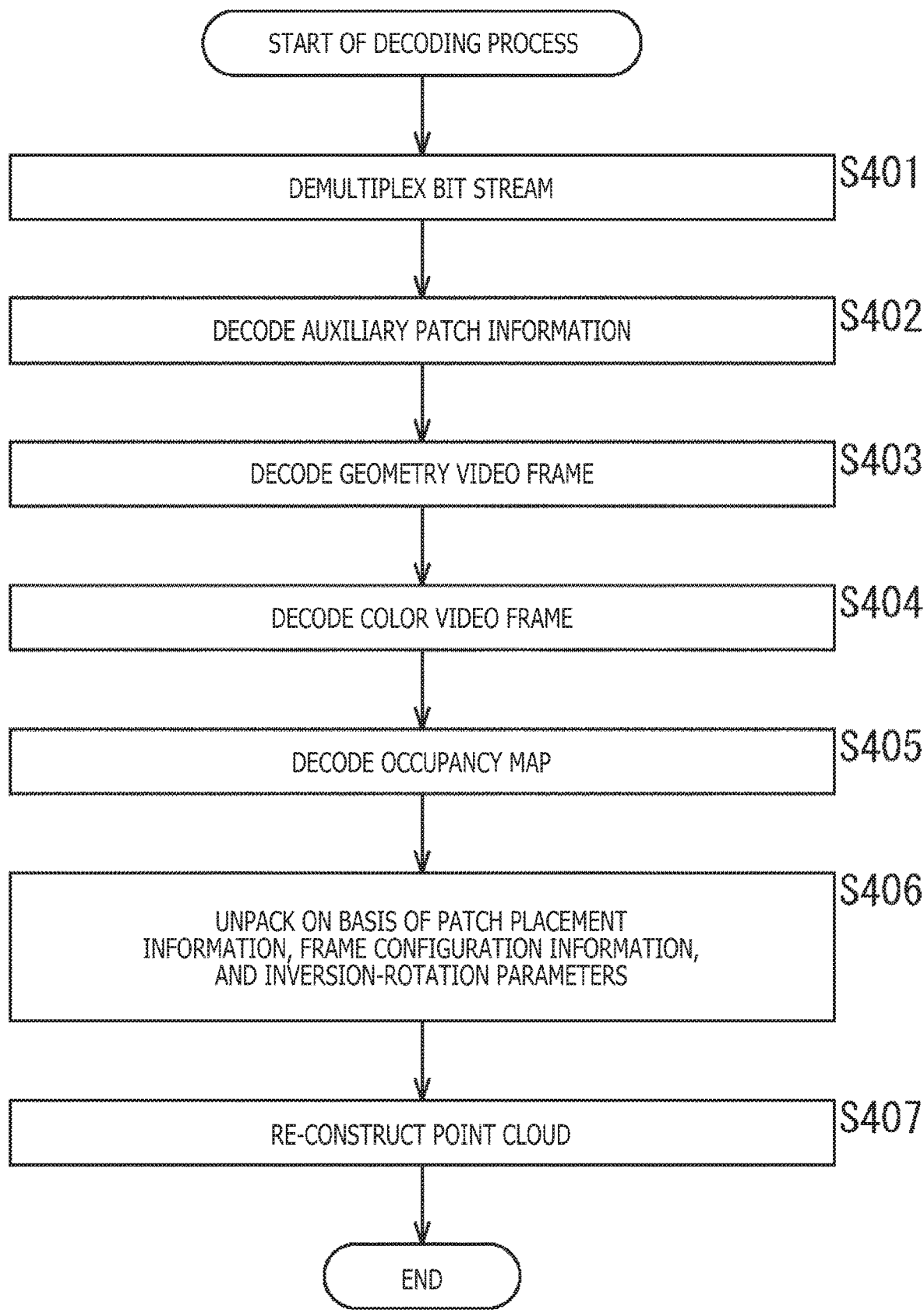
FIG. 19 is a flowchart illustrating an example of a flow of a decoding process.

Now, an example of a flow of a decoding process in this case is described with reference to a flowchart of FIG. 19.

When the decoding process is started, the demultiplexer 211 of the decoding apparatus 200 demultiplexes a bit stream in step S401.

In step S402, the auxiliary patch information decoding section 212 decodes auxiliary patch information extracted from the bit stream in step S401.

In step S403, the video decoding section 213 decodes encoded data of a geometry video frame (video frame of position information) extracted from the bit stream in step S401.

In step S404, the video decoding section 214 decodes encoded data of a color video stream (video frame of attribute information) extracted from the bit stream in step S401.

In step S405, the OMap decoding section 215 decodes encoded data of an occupancy map extracted from the bit stream in step S401.

In step S406, the unpacking section 216 unpacks the geometry video frame and the color video frame on the basis of control information relating to packing (including patch placement information, inversion-rotation parameters, and frame configuration information) extracted from the bit stream in step S401, to extract patches.

In step S407, the 3D re-construction section 217 re-constructs 3D data, for example, of a point cloud and so forth on the basis of the auxiliary patch information obtained in step S402, patches obtained in step S406 and so forth.

When the process in step S407 ends, the decoding process ends.

By performing the decoding process in such a manner as described above, the decoding apparatus 200 can correctly decode encoded data of frame images in which patches are placed and packed on the basis of evaluations of results of prediction, on the basis of patch placement information. As a result, improvement of the prediction accuracy can be realized. Accordingly, the encoding efficiency of a 2D moving image codec can be improved. In other words, reduction of the encoding efficiency can be suppressed.

4. Third Embodiment

<Intra-Prediction and Inter-Prediction>

Now, described is a case in which both a position at which the evaluation of an intra-prediction result is optimum and a frame image that is optimum in the evaluation of an inter-prediction result are searched for, an optimum one between them is selected, and then, a patch is placed in the selected frame image or position.

Also in this case, the configurations of the encoding apparatus 100 and the decoding apparatus 200 are similar to those in the case of the second embodiment.

Further, a flow of the encoding process in this case is similar to that in the case of the first embodiment (FIG. 10). Further, a flow of the decoding process in this case is similar to that in the case of the second embodiment (FIG. 19).

<Flow of Packing Process>

An example of a flow of the packing process in this case is described with reference to a flowchart of FIG. 20.

When the packing process is started, the patch placement section 151 selects a non-processed patch as a processing target (current patch), in step S501.

In step S502, the patch placement section 124 specifies frames and positions in which the current patch can be placed in the two-dimensional image.

In step S503, the optimization processing section 152 searches for a frame and a position optimum for placement of the current patch. After the search ends, the processing advances to step S504.

In step S504, the patch placement section 151 determines whether or not the current patch has been searched in an inverted state in all inversion directions. In the case where it is determined that there remains an inversion direction in regard to which the process has not been performed, the processing advances to step S505.

In step S505, the patch placement section 151 inverts the patch in the inversion direction in regard to which the process has not been performed. After the process in step S505 ends, the processing returns to step S502, and the subsequent processes are repeated. In short, the processes in step S502 to step S505 are executed in regard to each inversion direction. Then, in the case where it is determined in step S504 that the search has been performed in all inversion states, the processing advances to step S506.

In step S506, the patch placement section 151 determines whether or not the search has been performed in a state in which the current patch is rotated in all rotation angles. In the case where it is determined that there remains a rotation angle in regard to which the process has not been performed, the processing advances to step S507.

In step S507, the patch placement section 151 rotates the patch in the rotation angle in regard to which the process has not been performed. After the process in step S507 ends, the processing returns to step S502, and the subsequent processes are repeated. In short, the processes in step S502 to step S507 are executed in regard to each rotation angle. Then, in the case where it is determined in step S506 that the search has been performed in all rotation states, the processing advances to step S508.

In step S508, the patch placement section 151 places the current patch in the optimum frame image or optimum position searched out in step S303.

In step S509, the patch placement section 151 determines whether or not all patches are placed in the two-dimensional image. In the case where it is determined that there remains a non-processed patch, the processing returns to step S501, and the subsequent processes are executed. In short, the processes in step S501 to step S509 are executed in regard to each patch. Then, in the case where it is determined in step S509 that all patches are placed, the processing advances to step S510.

In step S510, the patch placement section 151 generates patch placement information in regard to the placed patches.

In step S511, the patch placement section 151 sets inversion-rotation parameters for the placed patches.

In step S512, the patch placement section 151 sets frame configuration information regarding the frame images in which the patches are placed.

In step S513, the OMap generation section 153 generates an occupancy map.

In step S514, the Dilation processing section 154 performs a Dilation process for the two-dimensional image in which the patches of position information are placed and the two-dimensional image in which the patches of attribute information are placed.

When the process in step S514 ends, the packing process ends, and the processing returns to FIG. 10.

<Flow of Optimum Frame Position Search Process>

Figure 20:
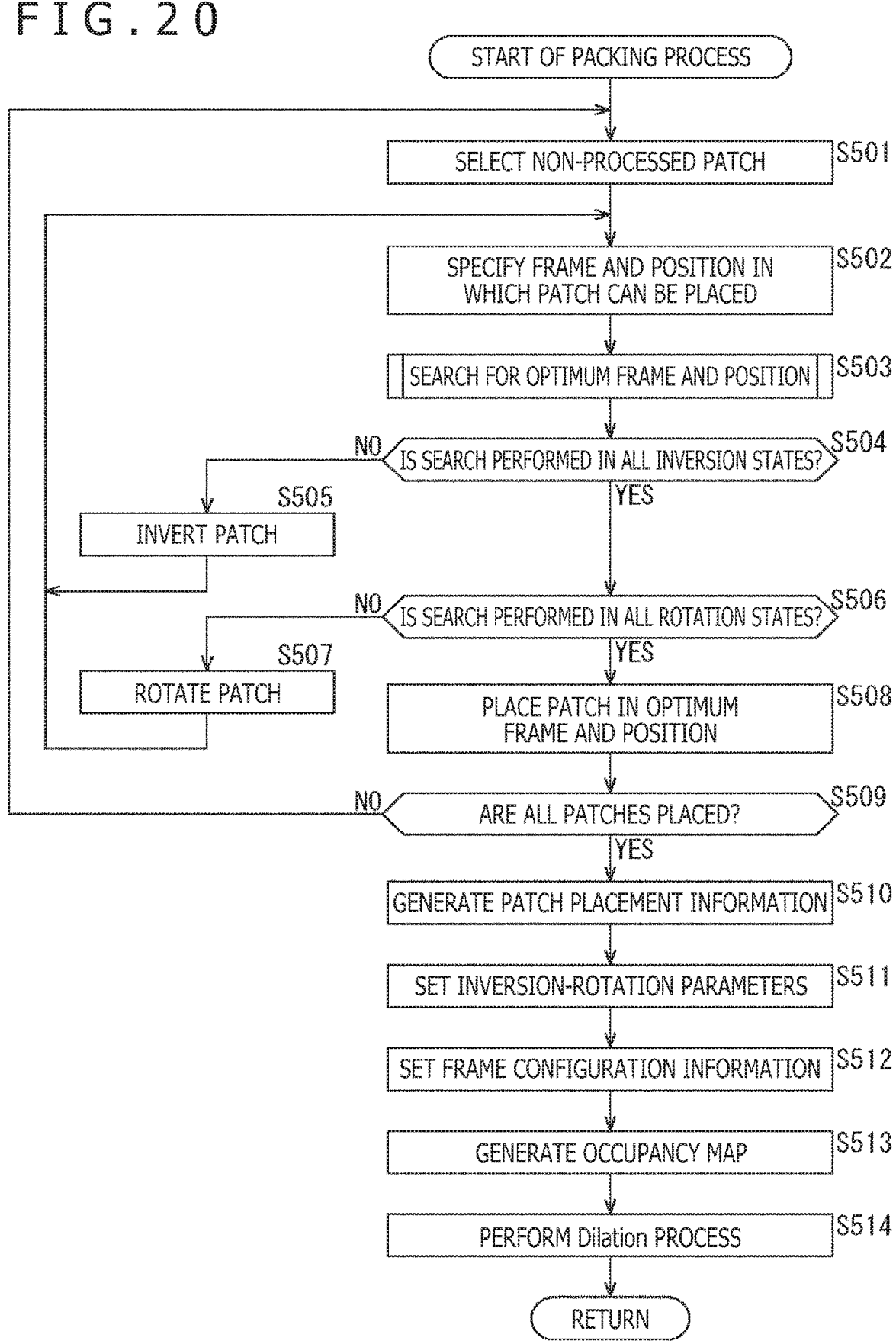
FIG. 20 is a flowchart illustrating an example of a flow of a packing process.
Figure 21:
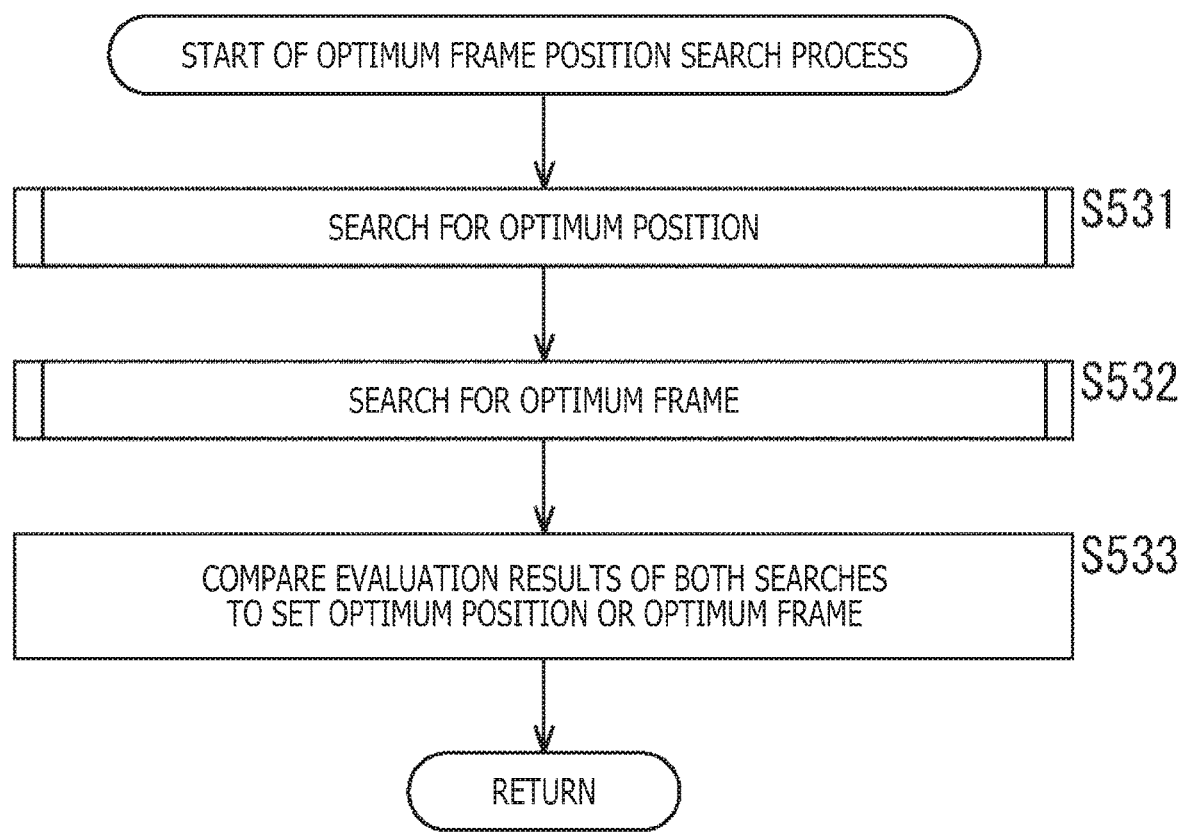
FIG. 21 is a flowchart illustrating an example of a flow of an optimum frame position search process.

Now, an example of a flow of the optimum frame position search process executed in step S503 of FIG. 20 is described with reference to a flowchart of FIG. 21.

When the optimum frame position search process is started, the optimization processing section 152 executes the optimum position search process (FIG. 12) to search for an optimum position in step S531.

In step S532, the optimization processing section 152 executes the optimum frame search process (FIG. 18) to search for an optimum frame image.

In step S533, the optimization processing section 152 compares the search result in step S531 and the search result in step S532 with each other to set an optimum position or an optimum frame.

When the process in step S533 ends, the optimum frame position search process ends, and the processing returns to FIG. 20.

By executing the processes in such a manner as described above, the encoding apparatus 100 can place and pack patches in a frame image on the basis of evaluations of results of prediction. As a result, the patches can be placed so as to improve the prediction accuracy. Accordingly, the encoding efficiency of a 2D moving image codec can be improved. In other words, reduction of the encoding efficiency can be suppressed.

5. Note

<Control Information>

Control information relating to the present technology described in connection with the embodiments may be transmitted from the encoding side to the decoding side. For example, control information (for example, enabled_flag) for controlling whether or not application of the present technology described above is to be permitted (or inhibited) may be transmitted. Further, for example, control information for designating a range within which it is permitted (or inhibited) to apply the present technology described above (for example, an upper limit or a lower limit to the block size or both of them, a slice, a picture, a sequence, a component, a view, a layer or the like) may be transmitted.

<Computer>

While the series of processes described above can be executed by hardware, it can otherwise be executed by software as well. In the case where the series of processes is executed by software, a program that constructs the software is installed in a computer. The computer here may be incorporated in hardware for exclusive use, a personal computer for universal use that can execute various functions by installing various programs in the personal computer or the like.

Figure 22:
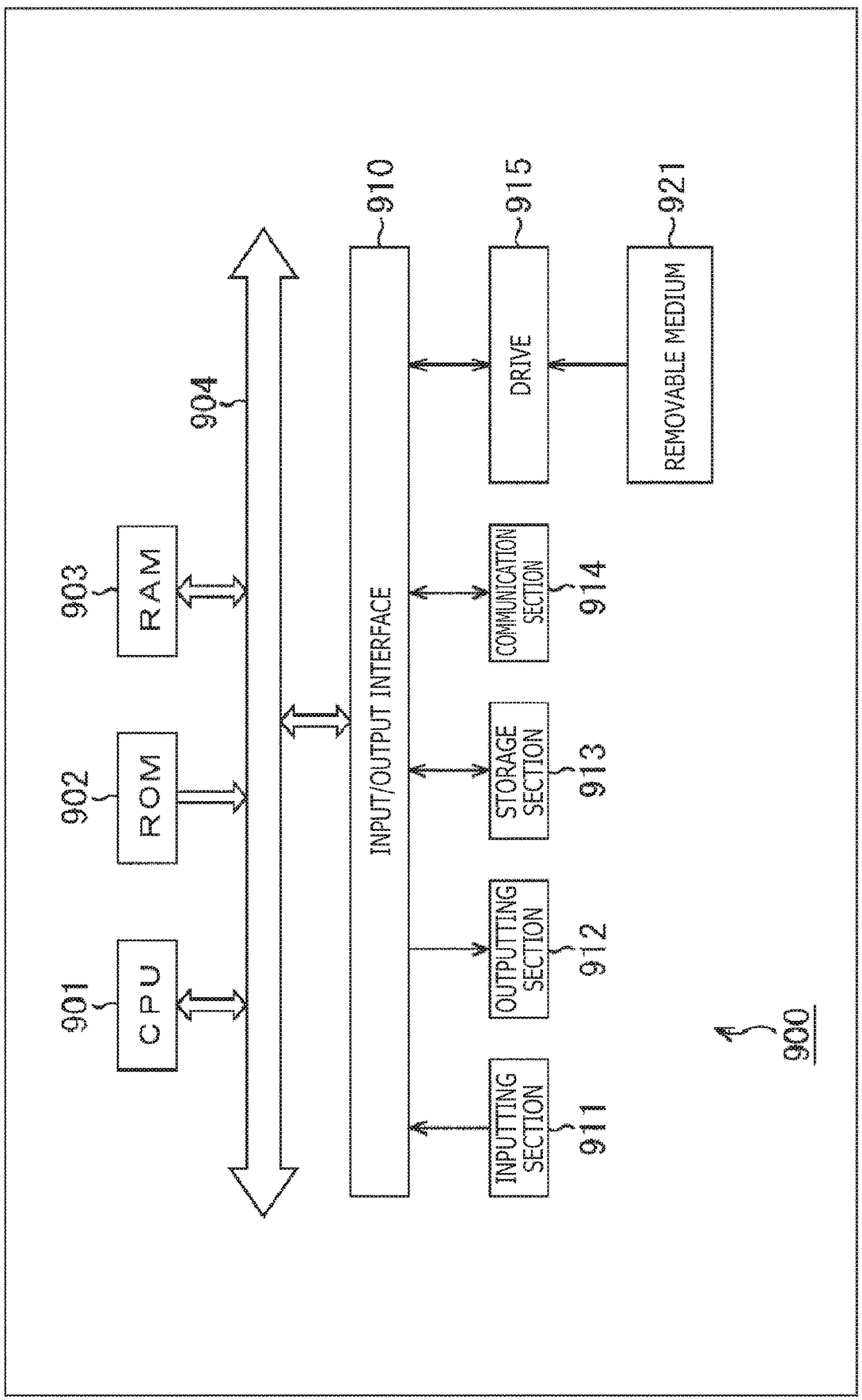
FIG. 22 is a block diagram depicting an example of principal components of a computer.

FIG. 22 is a block diagram depicting an example of a hardware configuration of a computer that executes the series of processes described hereinabove in accordance with a program.

In a computer 900 depicted in FIG. 22, a CPU (Central Processing Unit) 901, a ROM (Read Only Memory), 902, and a RAM (Random Access Memory) 903 are connected to one another by a bus 904.

Also, an input/output interface 910 is connected to the bus 904. An inputting section 911, an outputting section 912, a storage section 913, a communication section 914, and a drive 915 are connected to the input/output interface 910.

The inputting section 911 includes, for example, a keyboard, a mouse, a microphone, a touch panel, an input terminal and so forth. The outputting section 912 includes a display, a speaker, an output terminal and so forth. The storage section 913 includes, for example, a hard disk, a RAM disk, a nonvolatile memory or the like. The communication section 914 includes, for example, a network interface. The drive 915 drives a removable medium 921 such as a magnetic disk, an optical disk, a magneto-optical disk, or a semiconductor memory.

In the computer configured in such a manner as described above, the CPU 901 loads a program stored, for example, in the storage section 913, in the RAM 903 through the input/output interface 910 and the bus 904 and executes the program to perform the series of processes described above. Into the RAM 903, data and so forth necessary for the CPU 901 to execute various processes are also stored suitably.

The program to be executed by the computer (CPU 901) can be recorded on and applied as a removable medium 921 as, for example, a package medium. In such case, by mounting the removable medium 921 on the drive 915, the program can be installed in the storage section 913 through the input/output interface 910.

Also, it is possible to provide this program through a wired or wireless transmission medium such as a local area network, the Internet, or a digital satellite broadcast. In this case, the program can be received by the communication section 914 and installed in the storage section 913.

Alternatively, it is also possible to install the program in the ROM 902 or the storage section 913 in advance.

<Application Target of Present Technology>

While the foregoing description is directed to cases in which the present technology is applied to encoding-decoding of point cloud data, the present technology is not limited to those examples and can be applied to encoding-decoding of 3D data of any standard. In other words, specifications of various processes such as encoding and decoding methods and various kinds of data such as 3D data and metadata can be selected freely unless they are contradictory to the present technology described above. Further, part of the processes and specifications described above may be omitted unless they are contradictory to the present technology.

Further, while the foregoing description is directed to the encoding apparatus 100 and the decoding apparatus 200 as application examples of the present technology, the present technology can be applied to any configuration.

For example, the present technology can be applied to various kinds of electronic equipment such as a transmitter and a receiver (for example, a television receiver and a portable telephone set) in satellite broadcasting, cable broadcasting of a cable TV, delivery on the Internet or the like, or delivery to a terminal by cellular communication or an apparatus that records an image on a medium such as an optical disk, a magnetic disk, or a flash memory or reproduces an image from such recording medium (for example, a hard disk recorder and a camera).

Further, for example, the present technology can be carried out as a configuration of part of an apparatus such as a processor as system LSI (Large Scale Integration) or the like (for example, a video processor), a module that uses a plurality of processors and so forth (for example, a video module), a unit that uses a plurality of modules and so forth (for example, a video unit), or a set in which some other function is added to a unit (for example, a video set).

Further, for example, the present technology can also be applied to a network system configured from plural apparatuses. For example, the present technology may be carried out in cloud computing by which also apparatuses share and cooperate for processing through a network. For example, the present technology may be carried out in a cloud service that provides a service relating to an image (moving image) to any terminal such as a computer, AV (Audio Visual) equipment, a portable information processing terminal, or an IoT (Internet of Things) device.

It is to be noted that, in the present specification, the term "system" is used to signify an aggregation of plural components (devices, modules (parts) and so forth) and it does not matter whether or not all components are accommodated in the same housing. Accordingly, plural apparatuses accommodated in separate housings and connected to each other through a network are a system, and also one apparatus in which plural modules are accommodated in a single housing is a system.

<Field and Use to Which Present Technology is Applicable>

A system, an apparatus, a processing section and so forth to which the present technology is applied can be used in any field, for example, for transportation, medical care, crime prevention, agriculture, livestock industry, mining industry, beauty care, factories, home appliances, weather, and natural surveillance. Also the use of them can be selected freely.

<Others>

It is to be noted that the term "flag" in the present specification signifies information for identifying a plurality of states and includes not only information to be used when two states of the true (1) and the false (0) are to be identified but also information capable of identifying three or more states. Accordingly, the value that can be taken by the "flag" may be, for example, two values of 1/0 or may be three values or more. In other words, the bit number configuring the "flag" can be selected freely and may be 1 bit or a plurality of bits. Further, the identification information (including a flag) is assumed to have not only a form in which the identification information is included in a bit stream but also a form in which difference information of the identification information with respect to information that becomes a certain reference is included in a bit stream. Therefore, in the present specification, the "flag" and the "identification information" include not only such information as described above but also difference information of such information with respect to reference information.

Further, various kinds of information (metadata and so forth) relating to encoded data (bit stream) may be transmitted or recorded in any form if they are associated with the encoded data. Here, the term "associate" signifies that, for example, when one piece of data is to be processed, another piece of data can be used (linked). In short, pieces of data associated with each other may be put together as one piece of data or may be individual separate piece of data. For example, information associated with encoded data (image) may be transmitted on a transmission line different from that of the encoded data (image). Further, for example, information associated with encoded data (image) may be recorded on a recording medium separate from that of the encoded data (image) (or in a different recording area of the same recording medium). It is to be noted that this "association" may be made not for the overall data but for part of such data. For example, an image and information corresponding to the image may be associated with each other in any unit such as a plurality of frames, one frame, or a portion in a frame.

It is to be noted that, in the present specification, such terms as "synthesize," "multiplex," "add," "integrate," "include," "store," "put forth," "put in," and "insert" signify to combine multiple things in one such as to combine, for example, encoded data and metadata in one piece of data, and signifies one method of the "association" described above.

Further, the embodiment of the present technology is not limited to the embodiments described hereinabove and allows various alterations without departing from the subject matter of the present technology.

For example, the configuration described as one apparatus (or one processing section) may be divided so as to configure plural apparatuses (or processing sections). Conversely, the configurations described as plural apparatuses (or processing sections) in the foregoing description may be put together so as to configure a single apparatus (or processing section). Further, a configuration not described hereinabove may naturally be added to the configuration of the apparatuses (or processing sections). Further, if a configuration or operation of an entire system is substantially the same, then, some of the components of a certain apparatus (or processing section) may be included in the configuration of another apparatus (or another processing section).

Further, for example, the program described above may be executed by any apparatus. In such case, it is sufficient if the apparatus has necessary functions (functional blocks and so forth) and can obtain necessary information.

Further, each of the steps of one flowchart may be executed by a single apparatus or may be shared and executed by plural apparatuses. Further, in the case where plural processes are included in one step, the plural processes may be executed by one apparatus or may be shared and executed by plural apparatuses. In other words, it is also possible to execute plural processes included in one step as a process of plural steps. Conversely, it is also possible to collectively execute a process described as plural steps as one step.

Further, for example, in a program to be executed by a computer, processes in steps that describe the program may be carried out in a time series in the order as described in the present specification or may be executed in parallel or individually at necessary timings such as when the process is called. In short, the processes in the steps may be executed in an order different from the order described hereinabove unless they give rise to a contradiction. Further, the processes in the steps that describe this program may be executed in parallel to processes of some other program or may be executed in combination with processes of some other apparatus.

Further, for example, plural technologies relating to the present technology can be carried out alone and independently of each other unless they give rise to a contradiction. Naturally, plural present technologies that are selected freely can be carried out together. For example, it is also possible to carry out whole or part of the present technology described in connection with any of the embodiments in combination with whole or part of the present technology described in connection with a different one or ones of the embodiments. Also, it is possible to carry out freely-selected whole or part of the present technology together with some other technology that is not described hereinabove.

It is to be noted that the present technology can also take such a configuration as described below.

(1)

An image processing apparatus including:

a packing section configured to place and pack a patch in a frame image on the basis of an evaluation of a result of prediction performed in encoding of 3D data, the patch being an image where the 3D data representative of a three-dimensional structure is projected on a two-dimensional plane; and an encoding section configured to encode the frame image in which the patch is placed and packed by the packing section, by using the prediction.

(2)

The image processing apparatus according to (1), in which the packing section places the patch in the frame image on the basis of an evaluation of a result of intra-prediction.

(3)

The image processing apparatus according to (2), in which the packing section places the patch at a position of the frame image at which the evaluation of the result of the intra-prediction is optimum.

(4)

The image processing apparatus according to (3), in which the packing section searches for the position at which the evaluation of the result of the intra-prediction is optimum and places the patch at the searched out position.

(5)

The image processing apparatus according to (4), in which the packing section evaluates a difference between pixel values of opposite faces of a current patch and a peripheral patch to search for the position at which the evaluation of the result of the intra-prediction is optimum.

(6)

The image processing apparatus according to (4), in which the packing section evaluates results of the intra-prediction in all modes to search for the position at which the evaluation of the result of the intra-prediction is optimum.

(7)

The image processing apparatus according to (4), in which the packing section evaluates results of the intra-prediction in modes in a direction same as a direction of a Dilation process, to search for the position at which the evaluation of the result of the intra-prediction is optimum.

(8)

The image processing apparatus according to (4), in which the packing section evaluates a result of the intra-prediction in a predetermined mode among modes in a direction same as a direction of a Dilation process, to search for the position at which the evaluation of the result of the intra-prediction is optimum.

(9)

The image processing apparatus according to (4), in which the packing section searches for the position at which the evaluation of the result of the intra-prediction is optimum, in a state in which the patch is rotated.

(10)

The image processing apparatus according to (4), in which the packing section searches for the position at which the evaluation of the result of the intra-prediction is optimum, in a state in which the patch is inverted.

(11)

The image processing apparatus according to (2), further including:

a bit stream generation section configured to generate a bit stream including patch placement information indicative of a position of the patch placed by the packing section and encoded data of the frame image generated by the encoding section.

(12)

The image processing apparatus according to (1), in which the packing section places the patch in the frame image on the basis of an evaluation of an inter-prediction result.

(13)

The image processing apparatus according to (12), in which the packing section places the patch in a frame image that is optimum in the evaluation of the inter-prediction result.

(14)

The image processing apparatus according to (13), in which the packing section searches for the frame image that is optimum in the evaluation of the inter-prediction result and places the patch in the searched out frame image.

(15)

The image processing apparatus according to (14), in which the packing section searches for the frame image that is optimum in the evaluation of the inter-prediction result, in a state in which the patch is rotated.

(16)

The image processing apparatus according to (14), in which the packing section searches for the frame image that is optimum in the evaluation of the inter-prediction result, in a state in which the patch is inverted.

(17)

The image processing apparatus according to (12), further including:

a bit stream generation section configured to generate a bit stream including frame configuration information indicative of a configuration of a frame image in which the patch is placed by the packing section and encoded data of the frame image generated by the encoding section.

(18)

An image processing method including:

placing and packing a patch in a frame image on the basis of an evaluation of a result of prediction performed in encoding of 3D data, the patch being an image where the 3D data representative of a three-dimensional structure is projected on a two-dimensional plane; and encoding the frame image in which the patch is placed and packed, by using the prediction.

(19)

An image processing apparatus including:

a decoding section configured to decode encoded data of a frame image in which a patch is placed and packed on the basis of an evaluation of a result of prediction performed in encoding of 3D data, the patch being an image where the 3D data representative of a three-dimensional structure is projected on a two-dimensional plane; and an unpacking section configured to unpack the frame image generated by the decoding section, on the basis of patch placement information indicative of a position of the patch.

(20)

An image processing method including:

decoding encoded data of a frame image in which a patch is placed and packed on the basis of an evaluation of a result of prediction performed in encoding of 3D data, the patch being an image where the 3D data representative of a three-dimensional structure is projected on a two-dimensional plane; and unpacking the generated frame image on the basis of patch placement information indicative of a position of the patch.

REFERENCE SIGNS LIST

100 Encoding apparatus, 111 Patch decomposition section, 112 Packing section, 113 Auxiliary patch information compression section, 114 Video encoding section, 115 Video encoding section, 116 OMap encoding section, 117 Multiplexer, 151 Patch placement section, 152 Optimization processing section, 153 OMap generation section, 154 Dilation processing section, 200 Decoding apparatus, 211 Demultiplexer, 212 Auxiliary patch information decoding section, 213 Video decoding section, 214 Video decoding section, 215 OMap decoding section, 216 Unpacking section, 217 3D re-construction section

The invention claimed is:

1. An image processing apparatus, comprising:
a central processing unit (CPU) configured to:
acquire a patch of a specific image, wherein
the specific image corresponds to a projection of three-dimensional (3D) data on a two-dimensional plane, and
the 3D data represents a 3D structure;
evaluate a result of intra-prediction for the patch;
place the patch at a position in a frame image at which the evaluation of the result of the intra-prediction has a threshold value;
pack the frame image based on the placement of the patch at the position in the frame image; and
encode the packed frame image based on the intra-prediction.

2. The image processing apparatus according to claim 1, wherein the CPU is further configured to:
search for the position in the frame image at which the evaluation of the result of the intra-prediction has the threshold value; and
place the patch at the position based on the search of the position.

3. The image processing apparatus according to claim 2, wherein
the patch is a current patch, and
the CPU is further configured to:
evaluate a difference between a pixel value of a face of the current patch and a pixel value of a face of a peripheral patch, wherein the face of the current patch is opposite to the face of the peripheral patch; and search, based on the evaluated difference, the position at which the evaluation of the result of the intra-prediction has the threshold value.

4. The image processing apparatus according to claim 2, wherein the CPU is further configured to:
evaluate a plurality of results of the intra-prediction in a plurality of modes of the intra-prediction, wherein the plurality of results of the intra-prediction includes the result of the intra-prediction; and
search, based on the evaluation of the plurality of results of the intra-prediction, the position at which the evaluation of the result of the intra-prediction has the threshold value.

5. The image processing apparatus according to claim 2, wherein the CPU is further configured to:
evaluate a plurality of results of the intra-prediction in a plurality of modes, wherein
the intra-prediction is in a direction same as a direction of a dilation process, and
the plurality of results of the intra-prediction includes the result of the intra-prediction; and
search, based on the evaluation of the plurality of results of the intra-prediction, the position at which the evaluation of the result of the intra-prediction has the threshold value.

6. The image processing apparatus according to claim 2, wherein the CPU is further configured to:
evaluate the result of the intra-prediction in a specific mode among a plurality of modes, wherein the intra-prediction in the plurality of modes is in a direction same as a direction of a dilation process; and
search, based on the evaluation of the result of the intra-prediction in the specific mode, the position at which the evaluation of the result of the intra-prediction has the threshold value.

7. The image processing apparatus according to claim 2, wherein
the patch is in a rotated state, and
the CPU is further configured to search, based on the patch that is in the rotated state, the position at which the evaluation of the result of the intra-prediction has the threshold value.

8. The image processing apparatus according to claim 2, wherein
the patch is in an inverted state, and
the CPU is further configured to search, based on the patch that is in the inverted state, the position at which the evaluation of the result of the intra-prediction has the threshold value.

9. The image processing apparatus according to claim 1, wherein the CPU is further configured to generate a bit stream including:
patch placement information indicative of the position of the patch in the frame image, and
data of the encoded frame image.

10. The image processing apparatus according to claim 1, wherein the CPU is further configured to:
evaluate an inter-prediction result for the frame image; and
place the patch in the frame image based on the evaluation of the inter-prediction result.

11. The image processing apparatus according to claim 10, wherein the CPU is further configured to place the patch in the frame image based on the threshold value of the evaluation of the inter-prediction result for the frame image.

12. The image processing apparatus according to claim 11, wherein the CPU is further configured to:
search the frame image for which the evaluation of the inter-prediction result has the threshold value; and
place the patch in the frame image based on the search of the frame image.

13. The image processing apparatus according to claim 12, wherein
the patch is in a rotated state, and
the CPU is further configured to search, based on the patch that is in the rotated state, the frame image for which the evaluation of the inter-prediction result has the threshold value.

14. The image processing apparatus according to claim 12, wherein
the patch is in an inverted state, and
the CPU is further configured to search, based on the patch that is in the inverted state, the frame image for which the evaluation of the inter-prediction result has the threshold value.

15. The image processing apparatus according to claim 10, wherein the CPU is further configured to generate a bit stream including:
frame configuration information indicative of a configuration of the frame image in which the patch is placed, and
data of the encoded frame image.

16. An image processing method, comprising:
acquiring a patch of a specific image, wherein
the specific image corresponds to a projection of three-dimensional (3D) data on a two-dimensional plane, and
the 3D data represents a 3D structure;
evaluating a result of intra-prediction for the patch;
placing the patch at a position in a frame image at which the evaluation of the result of the intra-prediction has a threshold value;
packing the frame image based on the placement of the patch at the position in the frame image; and
encoding the packed frame image based on the intra-prediction.

17. An image processing apparatus, comprising:
a central processing unit (CPU) configured to:
acquire encoded data of a frame image and patch placement information, wherein
the frame image includes a patch of a specific image,
the patch placement information indicates a position of the patch in the frame image,
the patch is placed at the position in the frame image at which an evaluation of a result of intra-prediction has a threshold value,
the specific image corresponds to a projection of three-dimensional (3D) data on a two-dimensional plane, and
the 3D data represents a 3D structure;
decode the encoded data of the frame image to generate a decoded frame image; and
unpack the decoded frame image based on the patch placement information.

18. An image processing method, comprising:
acquiring encoded data of a frame image and patch placement information, wherein
the frame image includes a patch of a specific image,
the patch placement information indicates a position of the patch in the frame image,
the patch is placed at the position in the frame image at which an evaluation of a result of intra-prediction has a threshold value, the specific image corresponds to a projection of three-dimensional (3D) data on a two-dimensional plane, and the 3D data represents a 3D structure;

decoding the encoded data of the frame image to generate a decoded frame image; and unpacking the decoded frame image based on the patch placement information.

19. An image processing apparatus, comprising:

a central processing unit (CPU) configured to:

acquire a patch of a specific image, wherein the specific image corresponds to a projection of three-dimensional (3D) data on a two-dimensional plane, and the 3D data represents a 3D structure;

evaluate a result of inter-prediction for a frame image;

place the patch in the frame image based on a threshold value of the evaluation of the result of the inter-prediction for the frame image;

pack the frame image based on the placement of the patch in the frame image; and encode the packed frame image based on the inter-prediction.

\* \* \* \* \*